(12) United States Patent
Hunter, Jr.

(10) Patent No.: US 10,862,260 B2
(45) Date of Patent: Dec. 8, 2020

(54) INTEGRATION OF DIRECT COMPRESSOR WITH PRIMARY LASER SOURCE AND FAST COMPRESSOR

(71) Applicant: INNOVEN ENERGY LLC, Colorado Springs, CO (US)

(72) Inventor: Robert O. Hunter, Jr., Colorado Springs, CO (US)

(73) Assignee: Innoven Energy LLC, Colorado Springs, CO (US)

( * ) Notice: Subject to any disclaimer, the term of this patent is extended or adjusted under 35 U.S.C. 154(b) by 229 days.

(21) Appl. No.: 15/853,363

(22) Filed: Dec. 22, 2017

(65) Prior Publication Data

US 2018/0191120 A1 Jul. 5, 2018

Related U.S. Application Data

(60) Provisional application No. 62/177,150, filed on Jan. 3, 2017.

(51) Int. Cl.
*H01S 3/00* (2006.01)
*G21B 1/23* (2006.01)
*G02B 27/28* (2006.01)
*H01S 3/23* (2006.01)
*G21B 1/03* (2006.01)
*H01S 3/225* (2006.01)
*H01S 3/30* (2006.01)

(52) U.S. Cl.
CPC .............. *H01S 3/0057* (2013.01); *G21B 1/23* (2013.01); *G02B 27/286* (2013.01); *G21B 1/03* (2013.01); *H01S 3/005* (2013.01); *H01S 3/2256* (2013.01); *H01S 3/2383* (2013.01); *H01S 3/305* (2013.01)

(58) Field of Classification Search
CPC ........ H01S 3/0057; H01S 3/305; H01S 3/005; H01S 3/2256; H01S 3/2383; G21B 1/23; G21B 1/03; G02B 27/286
See application file for complete search history.

(56) References Cited

U.S. PATENT DOCUMENTS

| | | | | |
|---|---|---|---|---|
| 4,264,869 A | * | 4/1981 | Hunter | H01S 3/0057 359/342 |
| 4,337,437 A | * | 6/1982 | Hunter | G21B 1/23 359/349 |

(Continued)

OTHER PUBLICATIONS

Sawicki, R. et al., The National Ignition Facility: Laser System, Beam Line Design and Construction, Optical Engineering at the Lawrence Livermore National Laboratory II: The National Ignition Facility, Proceeding of SPIE, vol. 5341, 2004, pp. 43-53.

(Continued)

*Primary Examiner* — Jade R Chwasz

(57) ABSTRACT

A system and method for integrating a direct compressor with a primary laser source and fast compressor while also reducing the number of mechanical elements and gas interfaces. A nonlinear scattering aperture combiner does not need to be optically multiplexed in order to drive a direct compressor stage, but by producing a large temporal compression ratio it will then pump the fast compressor. In order to accomplish this, a technique for transversely segmenting by color and/or polarization of the optical extraction beams of the direct compressor is utilized.

20 Claims, 27 Drawing Sheets

(56) References Cited

U.S. PATENT DOCUMENTS

| | | | |
|---|---|---|---|
| 7,444,049 B1* | 10/2008 | Kim | H01S 3/0057 359/566 |
| 10,170,883 B1* | 1/2019 | Hunter, Jr. | H01S 3/108 |
| 2011/0002691 A1* | 1/2011 | Lin | H01S 3/0675 398/118 |
| 2018/0123314 A1 | 5/2018 | Hunter, Jr. | |
| 2018/0159290 A1 | 6/2018 | Hunter, Jr. | |

OTHER PUBLICATIONS

Averbakh, A. et al., Stimulated Molecular Scattering of Light in Gases at Different Pressures, Soviet Journal of Quantum Electronics, vol. 5, No. 10, 1976, pp. 1201-1206.

Ewing, J. et al., Optical Pulse Compressor Systems for Laser Fusion, IEEE Journal of Quantum Electronics, vol. QE-15, No. 5, May 1979, pp. 368-379.

Damzen, M. et al., High-Efficiency Laser Pulse Compression by Stimulated Brillouin Scattering, Optics Letters, vol. 8, No. 6, Jun. 1983, pp. 313-315.

Murray, J. et al., Raman Pulse Compression of Excimer Lasers for Application to Laser Fusion, IEEE Journal of Duantum Electronics, vol. QE-15, No. 5, May 1979, pp. 342-368.

Murray, J. et al., Experimental Observation and Suppression of Transverse Stimulated Brillouin Scattering in Large Optical Components, Journal of the Optical Society of America B, vol. 6, No. 12, Dec. 1989, pp. 2402-2411.

* cited by examiner

VIEW
Looking towards Fast Compressor

FIGURE 7

VIEW
Looking into Fast Compressor
from Direct Compressor

| CH1 | CH2 | CH3 | CH4 |
|-----|-----|-----|-----|
| CS1 | CS2 | CS3 | CS4 |
| CS5 | CS6 | CS7 | CS8 |
| CS9 | CS10 | CS11 | CS12 |
| CS13 | CS14 | CS15 | CS16 |

↑ UP

143

Figures 12A-C
A TOP VIEW
12A  210                                                    118
B SIDE VIEW
12B  210                                                    118
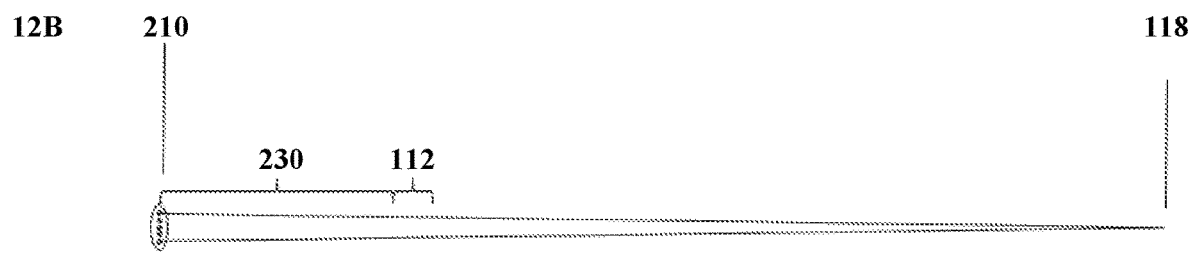
        230    112
C END VIEW
12C
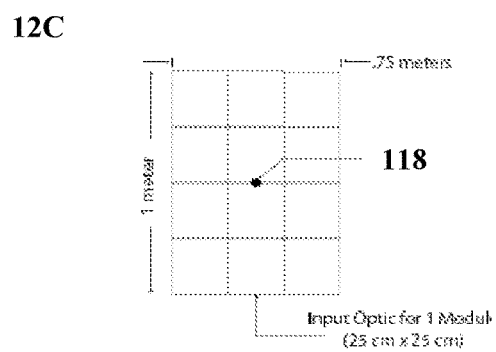

FIGURE 13

| FC SECTION NAME | PA | 1 | 2 | 3 |
|---|---|---|---|---|
| WIDTH (UNITS OF CHANNEL WIDTH) | .50 | .32 | .86 | 2.32 |

148a  148b  148c  148d

←—————— 1 Meter ——————→

FIGURE 21
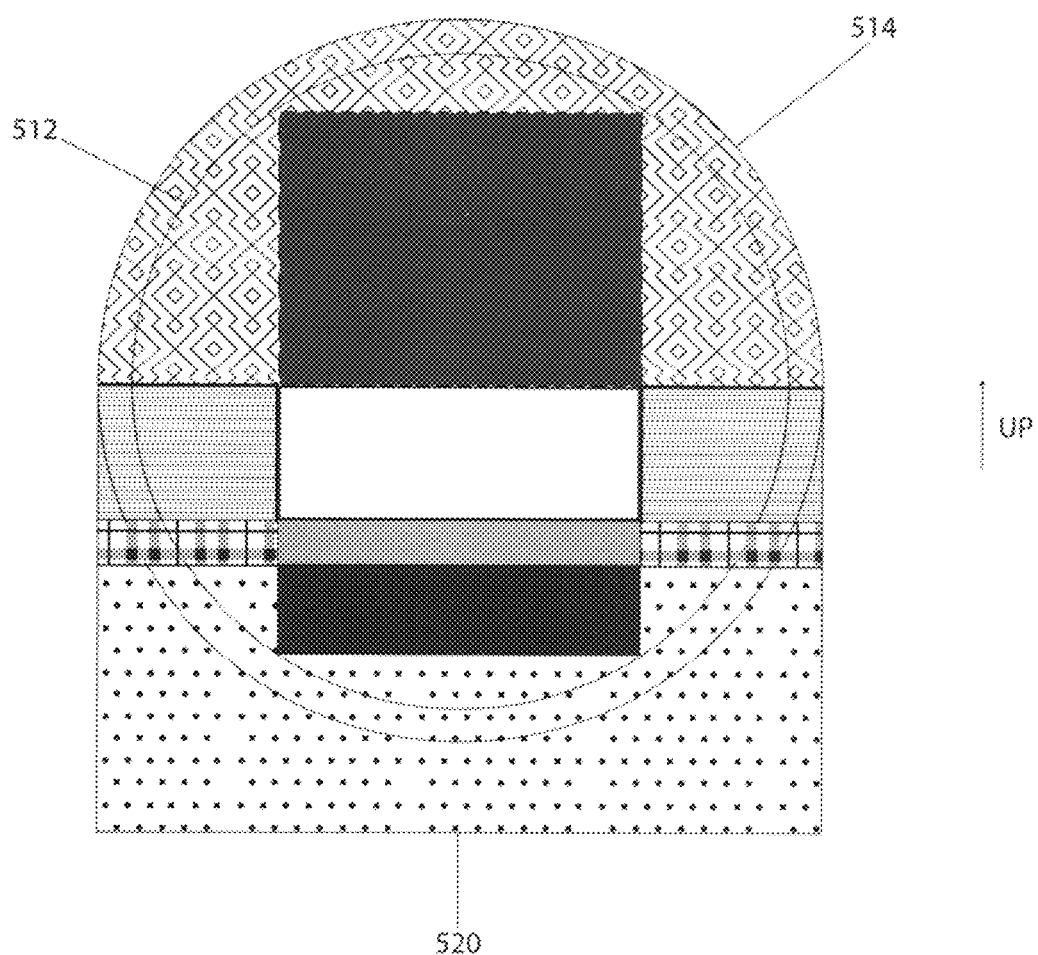
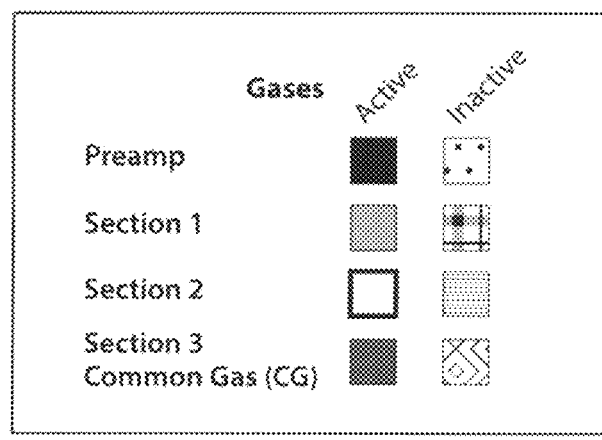

INTEGRATION OF DIRECT COMPRESSOR WITH PRIMARY LASER SOURCE AND FAST COMPRESSOR

CROSS-REFERENCE TO RELATED APPLICATIONS

This application claims priority to U.S. provisional patent application Ser. No. 62/177,150 titled Integration of Direct Compressor with Primary Laser Source and Fast Compressor filed on Jan. 3, 2017, and hereby incorporated by reference.

BACKGROUND

For certain applications, such as Inertial Confinement Fusion (ICF), it is desirable to utilize laser light as part of an energy production process. The use of lasers today is widespread in industrial, scientific and engineering applications. However, for ICF a major drawback to large-scale adoption may have been the cost and time to field a decisive demonstration of ICF itself, as well as the lack of a clear path to an economically attractive commercial realization for an energy production cycle.

In "*Optical Configurations for Fusion Laser,*" by R. O. Hunter, Jr., Aspen, Colo., submitted Dec. 7, 2016, Patent No. 62/497,908, and incorporated by reference, and "*Lookthrough Compression Arrangement,*" by R. O. Hunter, Jr., Aspen, Colo., submitted Oct. 31, 2016, Patent No. 62/496,885, and incorporated by reference, Innoven has outlined new laser architectures and elements that may lead to such a cycle. This patent contains a description of another type of overall architecture that may further reduce the cost and complexity for this application. Even though formulated for ICF energy production, there are potentially many applications for the inventions described herein in other areas. "*Optical Configurations for Fusion Laser,*" supra, described how to take laser energy generated at a longer pulse length and relatively poor beam quality and then compress it in space and time to produce a high energy pulse ($\gtrsim 10^7$ joules) in a short pulse length ($\sim 10^{-9}$ seconds) to impinge over a small area ($\sim 0.01$-$0.1$ cm$^2$) of an ICF target. Furthermore, it described how to do this at a reasonable efficiency.

The invented techniques enable the compression operation for the ICF application to occur in gaseous media and greatly reduced (near damage levels) the required area of material surfaces. This may result in laser systems with a $10^2$:1, or greater, reduction in precision optical element area for a given energy compared to existing technology, such as exemplified in the National Ignition Facility (NIF) (see "The National Ignition Facility: Laser System, Beam Line Design and Construction," by R. H. Sawicki, in M. A. Lane and C. R. Wuest (Eds.), *Optical Engineering at the Lawrence Livermore National Laboratory II: The National Ignition Facility, Proceedings of SPIE,* Vol. 5341, 2004, pp. 43-53, incorporated by reference herein for all purposes). Overall, the cost per unit of energy for the architecture and elements may be over $10^2$-$10^3$ lower than such existing technology. In addition, the reduction in optical element number, size, and precision permits rapid demonstration and deployment of the technology. Herein, further reduction in complexity and cost from the architecture shown in "*Optical Configurations for Fusion Laser,*" supra, may be realized by more compact packaging and reduction in number of separate beam paths to produce such compression and optical quality improvement.

"*Lookthrough Compression Arrangement,*" supra, details how an optical arrangement with very high optical gain for the input seed extraction pulse, amplified by converting the energy from a pump pulse, may be realized while having an output pulse length shorter than the pump pulse and of better optical quality. To avoid optical damage, the extraction pulse output, increased by the optical gain relative to the input optical fluence is then transmitted to the target without impinging on material optical elements. Considering the assembly for the extraction pulse and pump pulse interacting in scattering medium to be described as a stage, a single or multi-section stage arrangement with different gaseous media and/or optical scattering properties is described that enables very high gains of the extraction pulse output relative to its seed input. Gains of $10^3$-$10^4$ for particular applications and arrangements then may be realized, resulting in large reduction of costs relative to glass laser technology. In "*Lookthrough Compression Arrangement,*" supra, each separate channel of the Fast Compressor stage may be isolated from adjacent channels and may be driven by an associated pump pulse element, that may be compressed from the Primary Laser Source, such as that described in "*Optical Configurations for Fusion Laser,*" supra.

A copending patent application "*Optical Configurations for Fusion Laser,*" supra, described a general laser architecture that had a Primary Laser Source followed by a Compression Section and a Vacuum Transition that was directed towards irradiation of an Inertial Confinement Fusion (ICF) Target. This copending application described a method of forming the Compression Section that entailed an optically multiplexed Raman Aperture Combiner that addressed a multichannel array of Active Time Delay Mirrors (ATDMs) resulting in a large temporal compression ratio whose output then pumps a Fast Compressor.

There is a need for architecture and elements that may permit the temporal and spatial compression of low cost energy for the ICF application, leading to compression costs on the order of $1-$10/joule, a major improvement over the approximate $10$^3$/joule costs exemplified in NIF. Coupled with low cost Primary Laser Source energy generation, a cost reduction of over $10^2$:1 may be desired, thereby leading to economics suitable for both ICF technology demonstration (target ignition) and commercial energy production.

SUMMARY OF INVENTION

The present architecture utilizes a Nonlinear Scattering Aperture Combiner that does not need to be optically multiplexed and then drives a Direct Compressor stage that produces a large temporal compression ratio of about 300:1 to pump a Fast Compressor. This eliminates the need for a separate array of ATDMs, multiplexing optical elements, and, at the approximate $10^7$ joule energy output required for ICF, reduces the number of mechanical elements and gas interfaces from the order of $10^3$ to about 10. In addition, this provides a large reduction of the volume of the gas containment region. In order to accomplish this, a technique for transversely segmenting by color and/or polarization of the optical extraction beams of the Direct Compressor has been invented. This technique may also be applied to the Fast Compressor as well.

The laser design presented is intended to produce low cost (~$10.00/Joule) energy in a form suitable for use in the Innoven laser fusion technology. The key attributes are a short pulse (1 nanosecond is the baseline output pulse length), ultraviolet (0.25μ wavelength) light, large pulse energy ($10^{7+}$ joules), and the ability to produce small features (~100 microns) on the target at about a 30 meter focal length. Furthermore, the technology should be amenable to a short, high confidence delivery cycle (a few years) to produce ignition, with commercial technology shortly following.

The fundamental concept is to generate the light at low cost, then optically compress it in time and space and then convert to a near diffraction limited output. The architecture chosen is exemplified by utilization of KrF laser technology to generate $10^{7+}$ joules with a $3\times10^{-6}$ second pulse length from multiple Large Pump Modules (LPMs), combine the output from multiple LPMs in a Nonlinear Scattering Aperture Combiner (NSAC), and then temporally and spatially compress the pulse in two additional stages, the Direct Compressor (DC) and the Fast Compressor (FC). The light, then passes through a Vacuum Transition (VT) and impinge on the Target (T). In addition, a Propagation Gas (P) that transmits the light beams without active compression may be used. The optic costs are low since, past the last surfaces to handle the long pulse LPM outputs to the NSAC, the laser light is coupled directly by high optical gain (~$10^4$) amplifiers into the subsequent stage without material optical elements; consequently, no material surface sees the ~$10^3$ joules/cm$^2$ fluence output of the NSAC, DC, and FC. In essence, the stages act like very high gain mirrors with temporal compression, as the light may be redirected, focused and shaped as well. The stages may thus compress the light in time as well as space. The primary scattering process utilized in the compressors is Stimulated Molecular Scattering (STMS). The overall architecture is shown in FIG. 1.

The Direct Compressor is a major innovation based on an extension of the near atmospheric pressure multisection backward compression arrangement described in "Look-through Compression Arrangement," supra, extended longitudinally and transversely by techniques described herein to provide very high temporal compression ratios at large energy. The Preferred Embodiment presents detailed calculations of both a compact multisection FC and DC combination with based on color segmentation to produce very high output energies at low cost. The integration aspects are also considered in terms of producing various gas section embodiments. In addition, variations including the Direct Compressor functioning as both an aperture combiner and as a temporal compressor are shown. Overall, for a system of this complexity, there are many possible variants. The emphasis here is on the fundamental performance of very high fluence, high efficiency, low cost design for the ICF application.

BRIEF DESCRIPTION OF THE DRAWINGS

FIG. 7 shows the cross section of a 2 meter diameter tube and the positions of optical channels and color coding segments.

FIGS. 12a, 12b, 12c show a top, side, and end view of a Fast Compressor basic optical element layout for extraction of DC energy and focusing onto target.

FIG. 13 shows a mapping of constant fluence DC output channels (4 channels) on section of FC being pumped.

FIG. 21 shows an illustrative optical layout with DC/FC common gas and pooled FC section gases.

REFERENCE NUMERALS/ABBREVIATIONS

Figure 1:
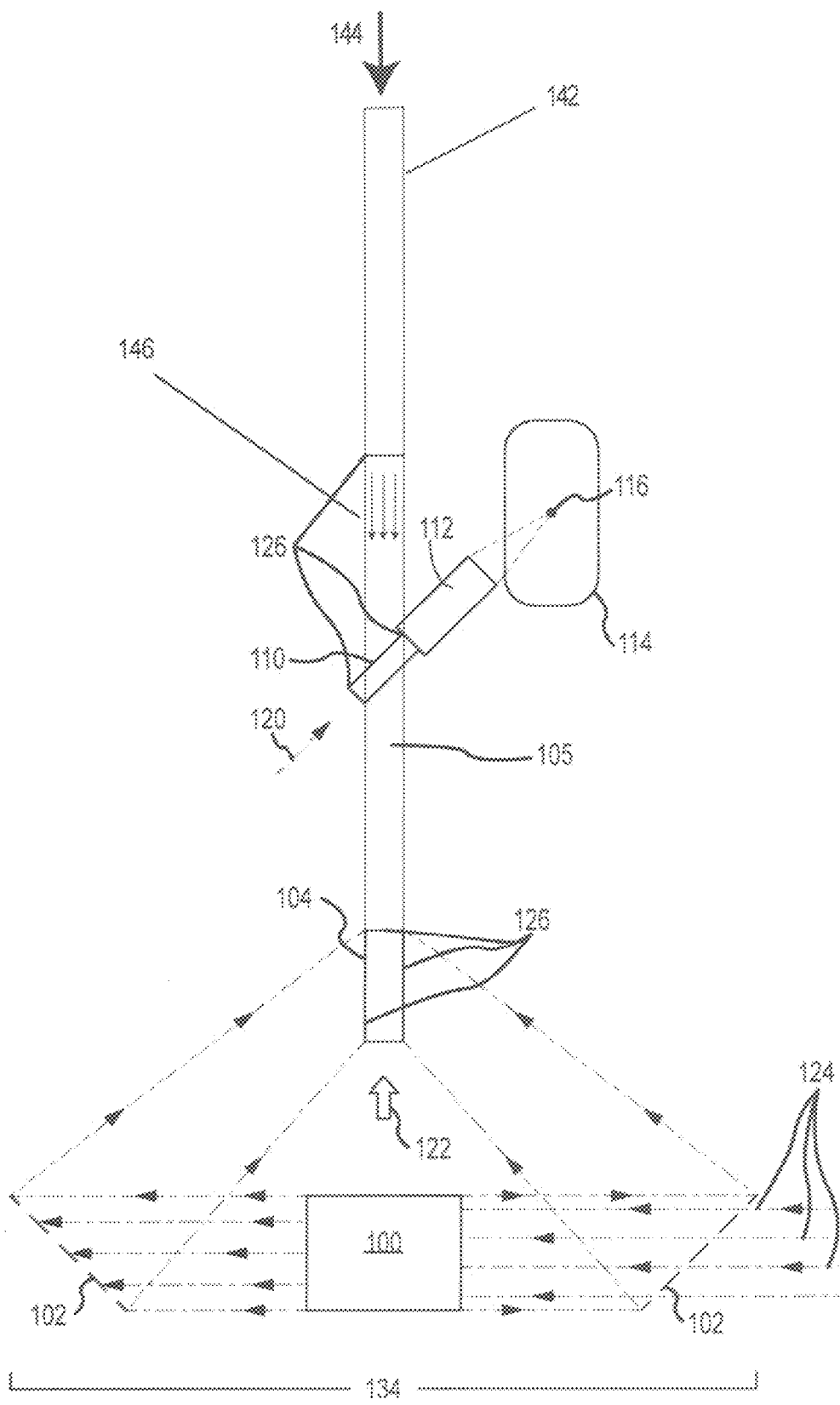
FIG. 1 illustrates the overall optical architecture made in accordance with an embodiment of the present inventions.

| | |
|---|---|
| 100 | Large Pump Module (LPM) |
| 102 | Turning Array (TA) |
| 104 | Nonlinear Scattering Aperture Combiner (NSAC) or Aperture Combiner or Raman Aperture Combiner (RAC) |
| 105 | Propagation Gas (P) |
| 106 | Time Delay Section |
| 108 | Active Time Delay Mirrors (ATDM) or Mirrors |
| 110 | Fast Compressor (FC) or Compressor |

-continued

| | |
|---|---|
| 112 | Vacuum Transition (VT) or Vacuum Transition Section or Transition Section |
| 114 | Target Chamber |
| 116 | Target |
| 118 | Backward Raman Mirror Inputs to Active Time Delay Mirrors |
| 120 | Fast Compressor Input |
| 122 | Nonlinear Scattering Aperture Combiner (NSAC) Input |
| 124 | Large Pump Module Input Beams |
| 126 | Shutter or Transient Aperture |
| 128 | Window |
| 130 | Ambient Environment Enclosure (AEE) |
| 132 | Compression Stage or Compression Section |
| 134 | Primary Laser Source (PLS) |
| 135 | Primary Laser Source Beam |
| 136 | Seed Laser Source (SLS) |
| 137 | Polarization Encoder |
| 138 | Seed Beam or Seed Laser Beam |
| 139 | Color Encoder |
| 140 | Vacuum Transition Aperture |
| 142 | Direct Compressor (DC) |
| 143 | Direct Compressor Enclosure |
| 144 | Direct Compressor Input Beams |
| 145 | Color and/or Polarization Segmentation Sections |
| 146 | Direct Compressor Output Beams |
| 147 | Direct Compressor Input Shaping Optics |
| 148 | Direct Compressor Channels |
| 148a | Direct Compressor Channel 1 |
| 148b | Direct Compressor Channel 2 |
| 148c | Direct Compressor Channel 3 |
| 148d | Direct Compressor Channel 4 |
| 148e | Direct Compressor Channel 5 |
| 148f | Direct Compressor Channel 6 |
| 150 | Direct Compressor Section (DCS) |
| 152 | Direct Compressor Section Medium (DCSM) |
| 154 | Transmissive Beam Dump |
| 155 | Beam Dump |
| 156 | Preamplifier (PA) |
| 160 | Extraction Pulse |
| 200 | Large Pump Module Optical Output |
| 202 | Nonlinear Scattering Aperture Combiner Optical Output |
| 204 | Time Delay Section Optical Output |
| 206 | Fast Compressor Optical Output |
| 208 | Vacuum Transition Output |
| 210 | Target Input |
| 212 | Active Time Delay Mirror Pump Input |
| 214 | Active Time Delay Mirror Pump Input Shutters |
| 216 | Active Time Delay Mirror Seed Input |
| 218 | Active Time Delay Mirror Amplified Output |
| 220 | Active Time Delay Mirror Amplified Output Shutters |
| 222 | Active Time Delay Mirror Reflector Module |
| 224 | Fast Compressor Input Shaping Optics |
| 226 | Target Hole |
| 228 | Optical Output at Target Hole |
| 230 | Interaction Region |
| 300 | Angularly Multiplexed Forward Raman Scattered Outputs |
| 302 | $N_2$ Gas Mixture Region |
| 304 | Argon Gas Region |
| 306 | Pump Beams from Turning Array |
| 308 | Turning Mirror |
| 310 | Nonlinear Scattering Aperture Combiner Input Beam Expander |
| 312 | Color Coded and Angularly Addressed Inputs |
| 400 | Backward Raman Mirror Input |
| 402 | Raman Mirror Conversion and Compression Region-$N_2$ mixtures |
| 404 | To Fast Compressor |
| 406 | Depleted Beam from Nonlinear Scattering Aperture Combiner |
| 408 | Nonlinear Scattering Aperture Combiner Beam |
| 500 | From Active Time Delay Mirrors |
| 502 | Vacuum |
| 504 | Transition Section Gas Region Shutter |
| 506 | Backward Brillouin Scattering Cell |
| 510 | Turning Mirror-Fast Compressor |
| 512 | Pump Channel Envelope |
| 514 | Pipe Inside Diameter (I.D.) |
| 516 | Center Line |
| 518 | Target Offset Position |
| 520 | Fast Compressor Gas Control Envelope |
| 600 | High Fluence Material Mirrors |

DETAILED DESCRIPTION

A. Terms and Definitions

Brillouin Scattering is generally a light scattering process whereby an acoustic wave in a gaseous, solid, or liquid medium is excited during a light scattering process. As with Raman scattering, the beam quality of the stimulated scattered beam may be decoupled from the pump beam and independent apertures combined into a diffraction-limited output under certain conditions. It has generally not been used at low gas pressure (~1 atmosphere) due to the low gain coefficient and pump and extraction limitations due to optical element damage. In some embodiments herein, it is used in the Fast Compressor Stage [140], for example, where very high pump fluences may be realized for the arrangements described herein. The ASE constraints for Brillouin scattering may be similar to those associated with Raman scattering for geometries of interest. In a typical operating regime, the allowable gain length products are generally somewhat less than those characteristic of the Raman scattering process. The frequency shift for Brillouin scattering is small for short wavelengths, leading to very high quantum efficiencies (≥0.999) for certain cases given herein. The gains are given by the same formula shown in the Raman scattering discussion above and are describable in terms of a coupling coefficient to combine the effects of the parameters governing the gain. The nomenclature is generally the same as for the Raman coupling constant. Particularly for backward scattering at low gas pressures (~1 atmosphere) and short wavelengths, the scattered excitation is the velocity field of undivided atoms or molecules as opposed to collective acoustic oscillations. In the Russian literature, the overall process is called Stimulated Molecular Scattering (STMS) and has been described by kinetic theory (see, for example, V. S. Averbakh, A. I. Makarov, and V. I. Talanov, "Stimulated Molecular Scattering of Light in Gases at Different Pressures," Soviet Journal of Quantum Electronics, Vol. 5, No. 10, pp. 1201-1206, 1976, incorporated by reference herein for all purposes).

Where the names Brillouin scattering, Raman scattering, and STMS are used, it is understood that the processes are interchangeable in the sense that other media scattering by a different mechanism may be substituted in that component.

Raman Scattering (include SVRS, SRRS) in this context generally refers to the scattering of light by an atom or molecule with internal degrees of freedom. In the scattering process, internal energy may be lost to or gained from the light field. Thus, the scattered light may be frequency shifted. For energy gained, the process is generally called anti-Stokes (higher scattered light frequency than the original light beam); for energy lost, the process is generally called Stokes scattering (lower frequency than the incident light beam). If Stokes scattering occurs multiple times, the first effect is called first Stokes; when the first Stokes downscatters, it is called second Stokes, etc. This convention also applies to Brillouin scattering and STMS. Stimulated Raman scattering may occur when there is net gain and is used extensively in the certain of the optical layouts described herein. A high intensity pump beam may pass through a Raman active medium and may be depleted; a second beam, often referred to as a seed beam, may be amplified in intensity. The pump beam energy may then be transferred to the seed beam. In gaseous media under certain circumstances, the beam quality of the seed beam may be decoupled from and made much better than that of the pump beam. Also, the quantum efficiency may be quite high since, for example, in nitrogen rotational Raman scattering the energy lost is generally ~$10^2$ cm$^{-1}$ out of $4\times10^4$ cm$^{-1}$ incident energy at a 0.25 micron (krypton fluoride) pump laser wavelength, implying a quantum efficiency of approximately 0.9975. Since light can scatter off any of the internal degrees of freedom, the largest gain process is often chosen to work with. The gain may be a function of pump and scattered light wavelengths, pump and scattered light pulse lengths, type and strength of transition, scattering angle between pump and stimulating beam, polarization, and/or line widths of the pump and scattered beams. Large scale Raman scattering may be used to combine many independent pump beams and/or to produce diffraction limited output from poor beam quality pump beams. A coupling coefficient may be used to relate the Raman gain and the pump power per area (optical pump flux). The Greek letter $\gamma$ is used herein and is usually in units of cm watt$^{-1}$. The gain is generally given by $\gamma I_p$, with the pump flux, $I_p$, in watts/cm$^2$. The gain is then in cm$^{-1}$. Gain length products of $\gamma I_p L$, where L is a characteristic length, may describe the amplification properties (units=nepers).

Stimulated molecular scattering (STMS) See Brillouin scattering.

Amplified Spontaneous Emission (ASE). For the forward and backward scattering processes incorporated herein, the amplified spontaneous emission (ASE) generated and amplified by the light beams may be used as a design consideration. Characteristically, gain length products of 10-40 due to ASE limitations may be possible, depending on the geometry. At large enough ASE amplification, the desired light beam energy is converted to unwanted ASE and represents a loss. Typical calculations herein use 1% of the desired beam energy converted to ASE as a criterion.

Forward ASE (FASE). For a given beam of light, this is the amplified spontaneous emission within 90° angle from the propagation direction of the light.

Backward ASE (BASE). For a given beam of light, this is the amplified spontaneous emission within 90°-180° angle from the propagation direction of the light.

Pump Pulse. For a given section, or a stage, the energy coming into it generates gain for an extraction pulse impinging on the same geometric volume. The pump pulse energy may thereby be converted into an increase in the extraction pulse energy.

Compression. The energy in a pump pulse may be temporally and spatially compressed during conversion to the extraction pulse energy in addition to the normal optical compression that may be associated with linear optics. Stages may be cascaded to produce an overall compression whose performance may be the product of multiple stage independent performances.

Extraction Pulse. For a given section or stage, the extraction pulse converts pump pulse energy into amplified extraction pulse energy while passing through a common section and/or stage volume.

Color. For a given laser beam, it may be considered to have a centerline (average) frequency and a bandwidth often referred to as Full Width at Half Maximum (FWHM). If two beams are separated in frequency by more than a FWHM, they may be considered two different colors.

Section. Medium filled region where the Extraction Pulse is amplified as it intersects with the Pump Pulse. Often the section is filled with a uniform coupling medium. In certain designs, the coupling constant may vary as a function of position.

Stage. A stage is a set of sections performing a discrete optical function. For example, temporal compression and beam quality improvement may be found in a Direct Compression Stage with, say, 3 sections. A stage may also have continuously varying properties.

Color Segmentation. An element of an optical beam that is predominantly a single color. The segmentation may be longitudinal and/or transverse with respect to the beam propagation direction. One segment may be isolated from another in terms of ASE interaction by shifting the ASE that may be centered at a particular frequency from one segment out of the frequency band where it may be substantially amplified in the other segment by offsetting the two segment colors. A given color segment may be denoted CS with an associated C for color.

Polarization Segmentation. Discussed in terms of linear polarization, it may also be utilized with circular polarizations and/or mixture of polarizations. An optical beam segment may have a different polarization than another so the ASE generated in one is not substantially amplified in the other. A given polarization segment may be denoted PS with an associated PO for polarization.

Channel. Describes the envelope of the path a particular pulse length and color and/or polarization beam follows. Used herein to primarily describe the output of the Direct Compressor that may have different fluences and time delays as a function of the channel address as well as color, pulse length and polarization. Used to match the Direct Compressor output to crossing angle of Fast Compressor extraction pulse.

B. General Operation

In this writing, the pulse temporal compression stage described as the Preferred Embodiment in "Optical Configurations for Fusion Laser," supra, is replaced by an apparatus called a Direct Compressor that may be capable of compressing a long (in time) optical pulse in a much simpler arrangement than described in "Optical Configurations for Fusion Laser," supra, and is then integrated with the type of Lookthrough Compression arrangement described in "Lookthrough Compression Arrangement," supra, (called a Fast Compressor) in a compact fashion, thereby reducing the number of optical and mechanical elements from the exemplary case presented in "Optical Configurations for Fusion Laser," supra. The number of major mechanical elements (transient openings, valves, environmental enclosures) separating the gaseous regions are markedly reduced. Production of direct compression of an optical beam by temporal ratios of over 10$^2$:1 at high efficiency may be obtained in a single stage by use of a multi-sectional Direct Compressor as described herein.

This patent application contains similar information to co-pending patent, "Method for Direct Compression of Laser Pulses with Large Temporal Ratio," by R. O Hunter, Aspen, Colo., submitted Jan. 3, 2017, Patent No. 62/498, 674, and incorporated by reference. However, this application is directed towards the integration aspects of this overall design. In particular, the high operating fluence are addressed in terms of avoiding optical damage and how to integrate the stages in fluid mechanical and optical aspects.

Each active stage (LPM, NSAC, DC, FC) may have an associated front end to provide its seed laser beam. The controlling properties may be in the various stage discussions. The key amplification elements of the pulse compression stages (FC, DC) are referred to as sections. The LPM, VT, NSAC, T and P stages do not provide temporal pulse compression. The summary overall performance is shown in Table 1.

TABLE 1

| OVERALL PERFORMANCE | |
|---|---|
| $E_{TARGET}$[1] | 10$^7$ joules |
| $\eta_{OVERALL}$[2] | .67 (LPM energy into Target) |
| $\tau_P$[3] | 10$^{-9}$ secs |

[1]$E_{TARGET}$ is laser energy through entrance holes to Hohlraum
[2]$\eta_{OVERALL}$ is $E_{TARGET}/E_{LPM}$
[3]$\tau_P$ is pulse length of energy delivered to target

TABLE 2

SUMMARY ELEMENT PERFORMANCE

| | LASER STAGES | | | | | | |
|---|---|---|---|---|---|---|---|
| | LPM | NSAC | P | DC | FC | VT | T |
| $E_{INPUT}$ (Joules) | 1.61E+002 | 1.61E+007 | 1.53E+007 | 1.53E+007 | 1.43E+007 | 1.11E+007 | 1.11E+007 |
| $E_{OUTPUT}$ (Joules) | 1.61E+007 | 1.53E+007 | 1.53E+007 | 1.43E+007 | 1.11E+007 | 1.11E+007 | 1.00E+007 |
| Input Pulse Length (Sec.) | 3.13E−006 | 3.13E−006 | 3.13E−006 | 3.13E−006 | 3.84E−008 | 1.00E−009 | 1.00E−009 |
| Output Pulse Length (Sec.) | 3.13E−006 | 3.13E−006 | 3.13E−006 | 3.84E−008 | 1.00E−009 | 1.00E−009 | 1.00E−009 |
| $G_{LS}^{(2)}$ | 1.00E+005 | 1.00E+004 | 1 | 8.44E+003 | 9.41E+003 | 1 | — |
| $\varepsilon_{OUT}^{(3)}$ (Joules/cm$^2$) | 7 | 1.53E+003 | 1.53E+003 | 1.43E+003 | 1.11E+003 | 1.11E+003$^{(1)}$ | 10$^9$ |
| $\eta_S^{(4)}$ | — | 0.9500 | 0.9996 | 0.9333 | 0.7781 | 0.9981 | 0.9004 |

$^{(1)}$At VT Entrance.
$^{(2)}G_{LS}$ is the large signal gain for that stage, defined as the optical output energy/input optical energy of the seed laser beam. For P and VT, the $G_{LS}$ is given nominally as 1 and is referenced to the total input energy as there are no seed beams for these stages..
$^{(3)}\varepsilon_{OUT}$ is the output fluence (energy/area) of a given stage.
$^{(4)}\eta_S$ is the stage efficiency.

The 10$^7$ joules is energy deposited onto the Target including allowance for pointing error and fluctuations in the laser properties (noise). The three active combination/compressor stages have high efficiencies that for the FC includes some overall beam train losses. The detailed stage designs and integration for the FC and the DC are described in the following sections. The other elements are described in detail in applications to be filed.

The design approach eliminates large (>0.5 meter diagonal) optics and stores the pump energy in a long pipe. No optical quality laser energy storage glass is required. Previous ICF targets have entailed significant non-uniformities in the drive pressure applied and surface properties, leading to severe stability and symmetry problems. This laser is designed to have good noise properties in terms of the output of the FC and, in conjunction with the Targets described elsewhere, will produce a drive pressure uniformity sufficient for good implosions. In particular, for the Preferred Embodiment low target irradiation noise is produced by having multiple output segments (i.e., 12) from the FC project the same pattern on the Target to average the individual outputs. In addition, the projected patterns are imaged in a given segment from the injected signal. Thus, given the FC geometry, the different parts of the image on target have essentially common paths to produce a high degree of uniformity in a given segment projected pattern. Also, the amplification is further averaged by the fashion in which the pump and extraction beams in the FC are crossed and placing the Target near the focus. For a high quality optical beam, this smooths the Fast Compressor Optical Output Beam. The gain media produce relatively small nonlinear effects, leading to near diffraction limited imaging. The stages are operated far below breakdown limits ($\lesssim 1/10$) and are gas based; damage in the bulk media is not of major importance. The high stage gains result in input optics being subject to low fluence (~0.1 joules/cm$^2$ for a gain of around 10$^4$ in each stage). This design approach places a premium on being able to accurately model the laser media responses. The leading physical processes are the transient response time of the media, nonlinear index leading to intensity dependent imaging, and amplified spontaneous emission. The copending patent application, "Lookthrough Compression Arrangement," supra, describes certain of the dominant phenomena in more detail.

The very low optical element volume and area enables a rapid development cycle and beam line demonstration before major manufacturing, which is minimal compared to, say, NIF. A major advance is the ability to achieve high stage gain at high efficiency for the three sequential active scattering stages. They need to be of high efficiency (0.6-0.9) in the aggregate. For this type of optical compression, a layout budget is that 0.7 of the LPM output energy is delivered into the desired target pattern. Since there are six major stages following the LPM, (NSAC, P, DC, FC, VT, T), this implies an average efficiency of about 0.94 per stage. The stages have nominally three main efficiencies; optical coupling, ASE, and extraction (ideal conversion of light from the previous stage). Some stages are simpler and do not convert the light from the previous stage (P, VT, T) and are expected to have higher efficiency. The design goal for an active stage (NSAC, DC, FC) is an extraction efficiency of 0.96 (excluding front ends), an ASE efficiency of 0.99 (1% loss in active regions) and an optical coupling efficiency of 0.95; leading to an overall efficiency of 0.94. Detailed cost and performance tradeoffs may be made for particular sections. These estimated efficiencies as are listed for a design based on the Preferred Embodiment in Table 2.

Low speed adaptive optics may be utilized to correct for linear medium disturbances for the FC. The stages have separate gas sections; some are separated mechanically (i.e., shutters) and in one variant, there are stable gas interfaces. Thus, around ten slow mechanical shutters of one meter aperture size are needed in total. The Direct Compressor (142) and Propagation Gas Regions (105) are in a large (1-2 meter) pipe. The major dynamic interface is the vacuum transition (110) in the VT stage.

The KrF LPMs are low cost, robust versions of previously demonstrated electron beam pumped technology. They represent a large fraction of the total cost and are built around known technology. The output windows or shutters with figured turning mirrors are the major optical elements.

The design approach relies on the ability to accurately model the gaseous media responses. The scattering processes are well understood and the large reduction in cost and complexity is achieved through detailed analysis of the compression and transition stages.

The earlier design ("Optical Configurations for Fusion Laser," supra) was based on separate ATDMs sequentially addressed by a Raman Aperture Combiner (RAC) and resulted in some 36×8=288 separate time compression channels that were directed at eight separate Fast Compressor (FC) stages. The mechanical shutter count was around 1,000 with a typical 0.3-meter aperture. The design presented here may reduce the time compression channel count in the Direct Compressor (DC) stage to one. As described below, a few separate channels of the DC with the same temporal compression are staggered in time to give good matching to the FC. Also, the previous eight Fast Compressors have been reduced to one. One main aspect of such reductions in complexity is the ability to control the Amplified Spontaneous Emission (ASE). The Preferred Embodiment presented below is based on a level of segmentation at the 25 cm channel size with ASE isolation produced by color changes from segment to segment. This design delivers about $10^7$ joules/m$^2$ of optical area. Further improvement in the control of ASE could lead to up to about $10^8$ joules/m$^2$. This design illustrates the compaction achieved by integration of the various functions. The present design is based on a nominal 25 cm square color segment size due to two considerations:

(1) Minimum optics costs and large available production capacity per area near this size, and
(2) ASE may be controlled at this size in the various sections with simple color offsets.
(3) Overall parameters characterizing the stages include Large Signal Gain ($G_{LS}$), Stage Efficiency ($\eta s$), and optical fluence at the entrance to a section or stage ($\varepsilon si$) and at the output ($\varepsilon so$). The fundamental criteria are stage $G_{LS}$ values sufficient to avoid material optical damage while having high stage efficiency (including losses).

The particular design shown includes calculations for the ASE losses in the various sections, the optical breakdown margin, and the nonlinear imaging parameter B.

There has not been an effort to optimize the entire design. The light generation region, the Large Pump Module (LPM), may be optimized separately for energy generated and delivered to the Nonlinear Scattering Aperture Combiner (NSAC). For the design approach chosen, the pulse length may vary somewhat from the nominal $3\times10^{-6}$ seconds, however, it is unlikely that the LPM pump pulse will approach the approximately $10^{-8}$ seconds used to drive the Fast Compressor at an economic value ($\leq$$5.00- $10.00/ joule) in the near future. With the Direct Compressor in the chain of stages, the LPM may then be separately optimized. The NSAC and the DC have some detailed design interplay, yet it appears they may also be separately optimized. The drive for the preamplifier section of the FC has been packaged to be driven by the DC. This is a tradeoff with the complexity of the FC front end. Design changes may be anticipated in this area, particularly as the cost tradeoffs with the FC and the VT are explored in detail.

One area that may reduce complexity further are ASE suppression methods that enable single color operation with higher FC and/or DC output fluences and higher VT fluences.

The approach taken in the design is to consider the 25 cm segment size with commensurate ASE growth without any further suppression. To that end, the ASE losses are based on the estimate from the computations generated to date made by Innoven with a 3-D code.

The overall design method is to set the operating fluence based on a 1 nanosecond output pulse at $10^7$ joules onto the target, set the ASE allowed fluence at the vacuum transition, set the sections for the FC stage, then set the sections for the DC stage. The design approach has been to make the stages at high efficiency ($\eta_{RAC}$ $\eta_P$ $\eta_{DC}$ $\eta_{FC}$ $\eta_{VT}$ $\eta_T \cong 0.7 \geq \eta_{STAGE} \sim 0.94$). For each stage, its efficiency is a product of three main parameters; $\eta_{OC}$, or optical coupling efficiency, $\eta_E$, or extraction efficiency, and $\eta_{ASE}$, or efficiency due to spontaneous emission losses including amplification. The overall linear transmission efficiency is kept as a separate multiplier (due to impurity levels and low-level induced absorption in the gases), as it is not separated out by stage and sections. The Preferred Embodiment design is for a DC/FC crossing angle of 10°. The various factors will change as a function of the crossing angle, however, the choice permits a reasonable estimate of the geometric factors governing efficiency.

This patent application is aimed at the DC, as it provides very substantial advantages over previously published techniques ("Optical Pulse Compressor Systems for Laser Fusion," by J. J. Ewing, R. A. Haas, J. C. Swingle, E. V. George, and W. F. Krupke, IEEE Journal of Quantum Electronics, Vol. QE-15, No. 5, May, 1979, pp. 368-379, "High-Efficiency Laser Pulse Compression by Stimulated Brillouin Scattering," by M. J. Damzen and H. Hutchinson, Optics Letters, Vol. 8, No. 6, June 1983, pp. 313-315, "Raman Pulse Compression of Excimer Lasers for Application to Laser Fusion," by J. R. Murray, J. Goldhar, D. Eimerl, and A. Szöke, IEEE Journal of Quantum Electronics, Vol. QE-15, No. 5, May 1979, pp. 342-368) and may provide simplifications to the compression technologies involving ATDMs and optical multiplexing of the combiner set forth in "Optical Configurations for Fusion Laser," supra.

A second copending patent application, "Integration of Direct Compressor with Primary Laser Source and Fast Compressor," supra, is aimed at the integration of the DC into the overall architecture, particularly as regards gas, mechanical and damage aspects of its operation.

C. Specific Embodiments

Referring to FIG. 1, the Primary Laser Source (PLS) (134) produces an output laser pulse that is matched to the Nonlinear Scattering Aperture Combiner (NSAC) (104). In this figure, the Large Pump Module (LPM) (100) and Turning Array (TA) (102) are the PLS (134). The output from the LPM (100) and NSAC (104) is then temporally and spatially compressed in two additional stages, the Direct Compressor (DC) (142) and the Fast Compressor (FC) (110). The light, then passes through a Vacuum Transition (VT) (112) and impinge on the Target (T) (116) within Target Chamber (114). In addition, a Propagation Gas (P) (105) that transmits the light beams without active compression may be used. In essence, the stages act like very high gain mirrors with temporal compression, as the light may be redirected, focused and shaped as well. The stages may thus compress the light in time as well as space. The primary scattering process utilized in the compressors is Stimulated Molecular Scattering (STMS). Depending on the design of the NSAC (104), the spectral content may be temporally controlled. For example, a NSAC (a subclass of RAC) utilizing nitrogen or a hydrogen isotope may entail a bandwidth of its pump (the PLS) being substantially less than the scattering linewidth of the Raman medium. If a Brillouin process for the NSAC is utilized, modulation of its pump beams, from the PLS, may temporally shift or chirp the frequency of the PLS to prevent deleterious buildup of FASE in the NSAC (104) due to the fairly long pulse width. The NSAC then combines the various pump beams and produces a temporally near constant output pulse that is directed towards the DC.

Figure 24:
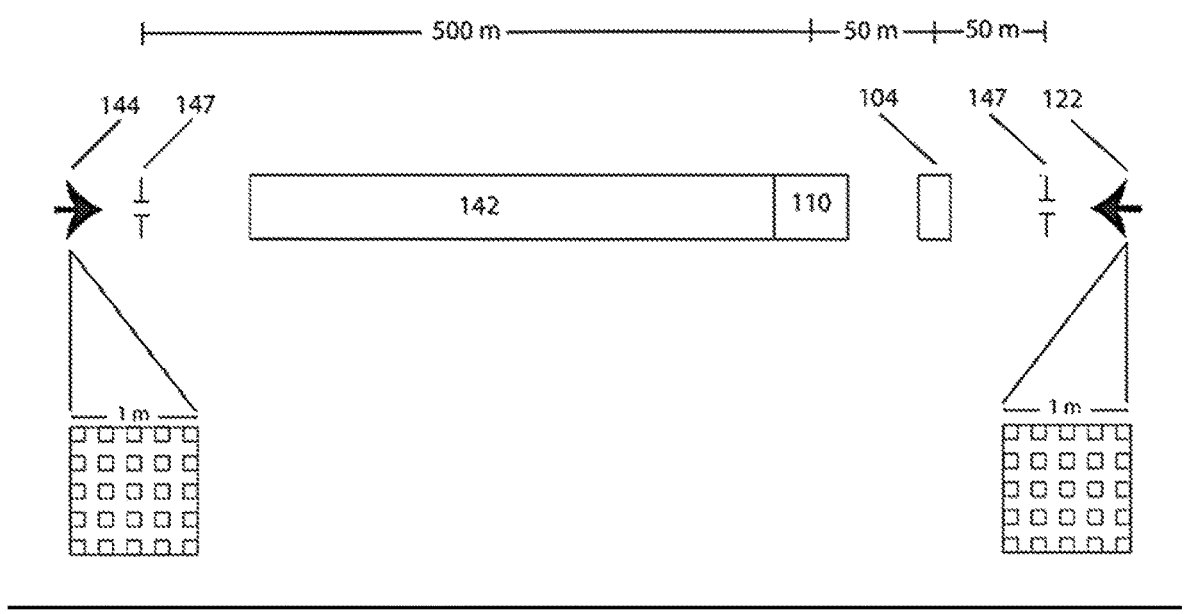
FIG. 24 shows NSAC optics and imaging onto support of input optics for DC to prevent damage.
Figure 25:
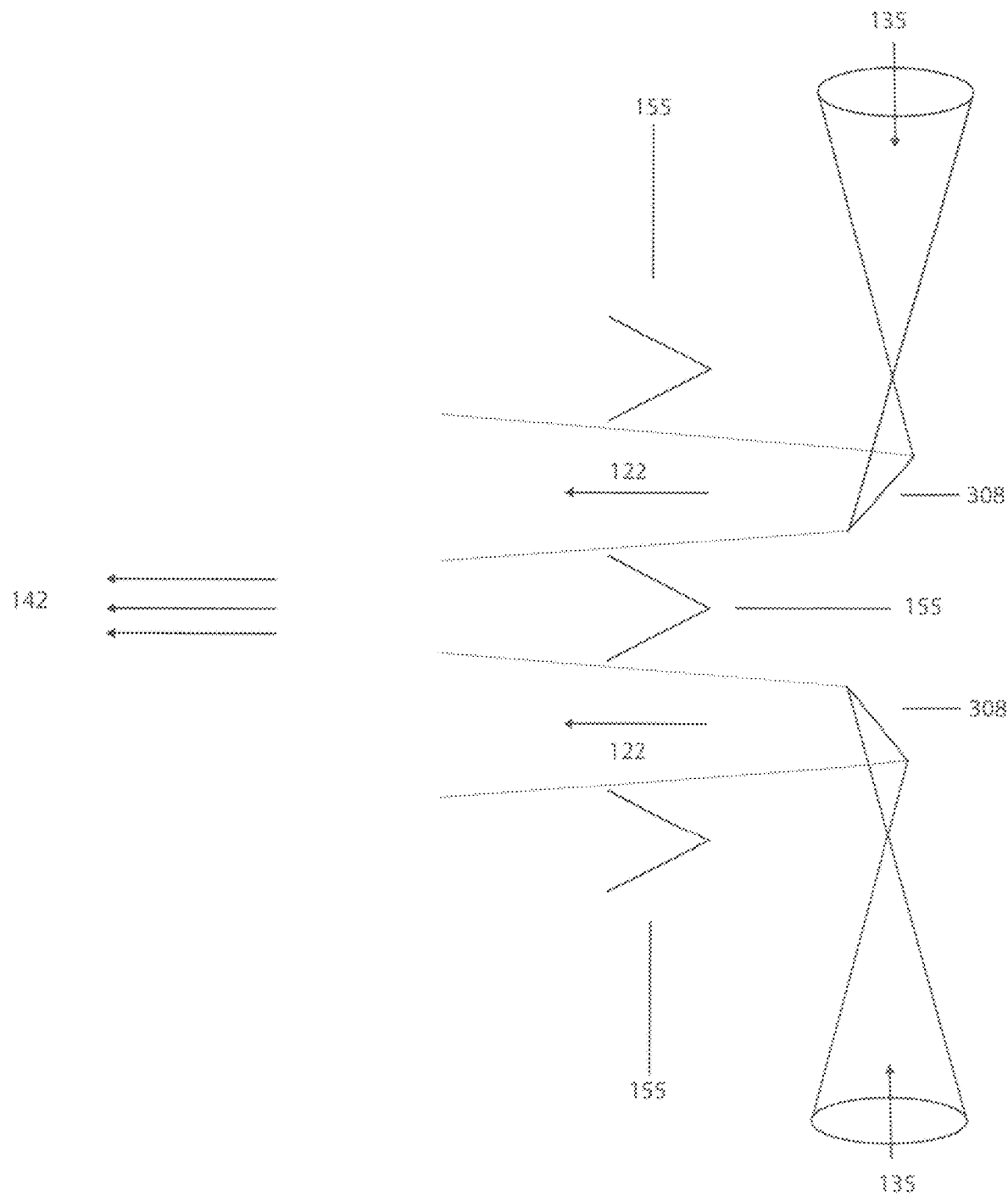
FIG. 25 shows a disposable and/or grazing angle input optics to NSAC to prevent damage.

The seed laser source sizes may be estimated from Table 2 above; The $E_{OUTPUT}/G_{LS}$ for the active stages are: LPM ($1.6 \times 10^2$ joules), NSAC ($1.5 \times 10^3$ joules), DC ($1.7 \times 10^3$ joules), and FC ($1.2 \times 10^3$ joules) in the Preferred Embodiment. The seed fluences and fluences are small enough to be handled by material surfaces (mirrors, lenses, etc.). As discussed below, avoidance of optical damage to the permanent optical elements in the NSAC (104) and the DC (142), given the very high operating fluence and inline optical geometry, is a major design consideration and various methods are shown in FIGS. 24 through 25 and discussed below.

The calculations performed to date indicate the FASE generated by the output of the NSAC (104) as it propagates through P (105), FC (110) and into the DC (142) is low enough that the full aperture of 1 meter may be utilized without having to expressly control the ASE (130) of the DC pump beam from the NSAC. In the DC, the extraction beam pulse length is now shorter by a factor of $1-3 \times 10^2$ than that of the pump beam. Consequently, the ASE for the DC extraction beam will produce very large losses unless controlled by some form of isolation.

Figure 6:
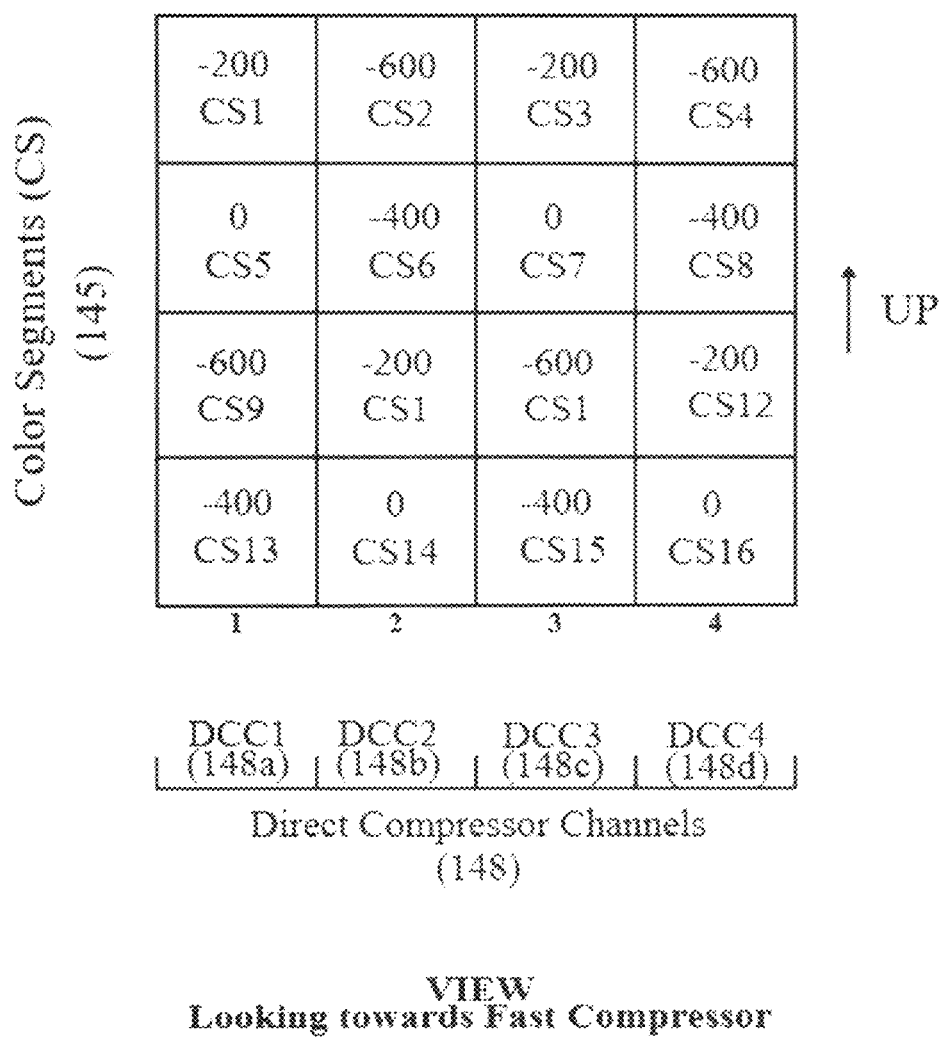
FIG. 6 shows color segmentation for the Preferred Embodiment coding and channel Direct Compressor.
Figure 8:
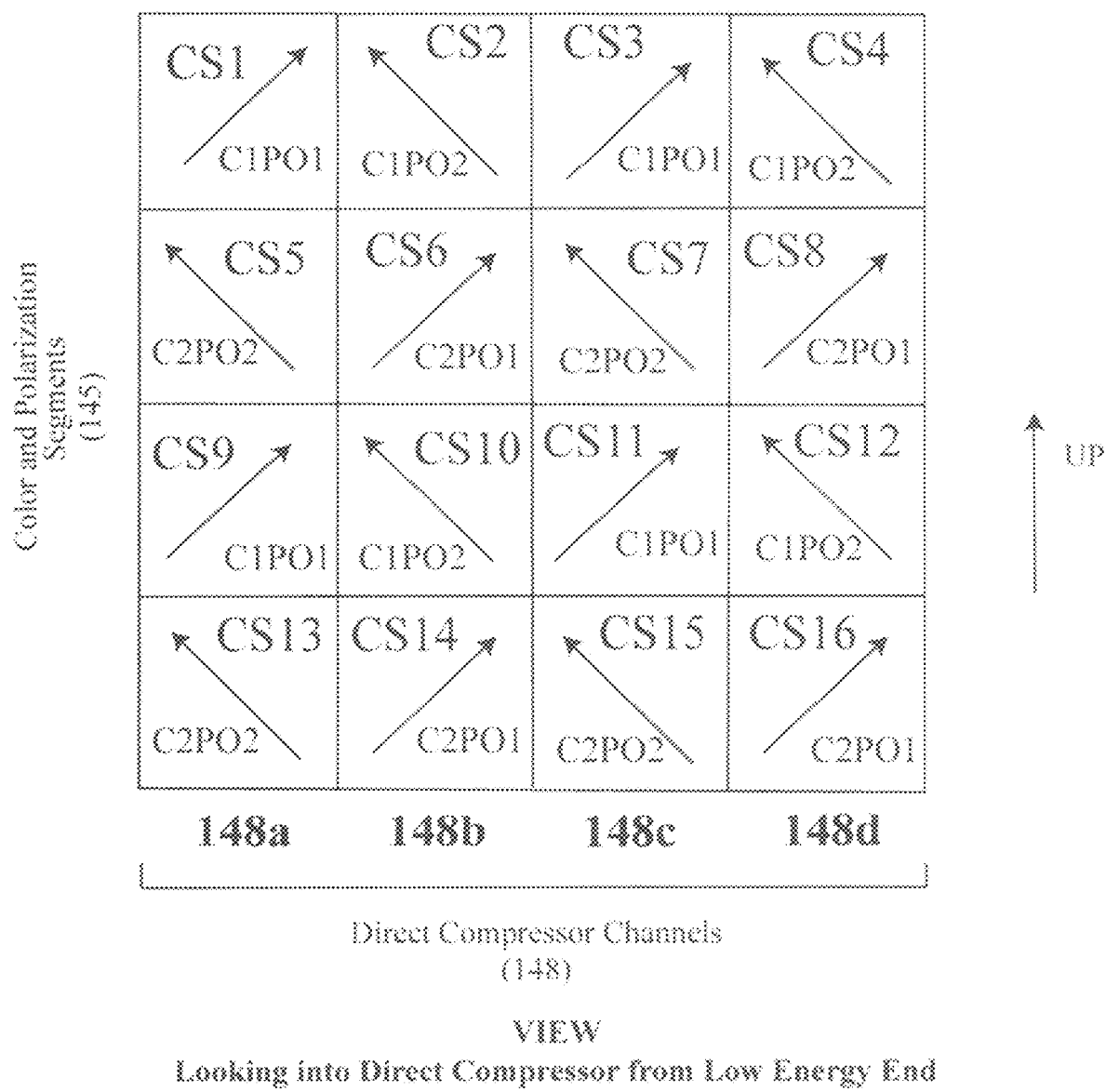
FIG. 8 illustrates a variation where a combination of color and polarization coding is used.

One form is discussed below, called Color Segmentation, where adjacent segments of the DC extraction beam are driven by seed laser sources having offset frequencies with the offset being less than the effective DC gain bandwidth. FIG. 6 shows a 1 square meter array of Color Segments representing the horizontal rows and Direct Compressor Channels (148a, 148b, 148c, 148d) representing the vertical columns, when looking towards the Fast Compressor (404). The array depicts offset frequencies, or, different colors, that may be sufficient to keep the FASE from exceeding the 1% level of the DC extraction pulse energy. Different segment polarizations (145) may also be utilized, separately or in addition to color segmentation which is shown in FIG. 8. FIG. 8 shows a 1 square meter array of Color Segments and Polarization Segments representing the horizontal rows and Direct Compressor Channels (148a, 148b, 148c, 148d) representing the vertical columns, when looking into Direct Compressor. This type of segmentation permits essentially apertures of arbitrary transverse dimension to be constructed without the need for physical isolation between the segments. The color and polarization encoding of the DC output beam may change the coupling properties of the DC to the FC; however, it may be matched by adjusting the mixture of scattering gasses in the FC and/or the optical characteristics of the FC extraction pulse. For simplicity of analysis, the fluence is assumed constant across the DC output aperture. Thus, the FC sections with the highest coupling constant may be regions where the pump from the DC FASE becomes a problem.

Figure 9:
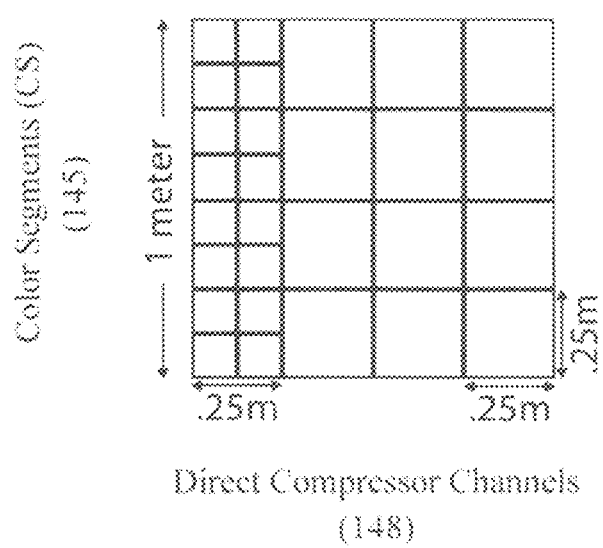
FIG. 9 shows variation of color coding where a high coding density is used to suppress FASE for the DC Output pulse traversing a long segment of FC PA gas.

As shown in FIG. 9, the color segmentation density may be increased to control the FC pump FASE as the limiting factor for segment width as opposed to the DC extraction pulse FASE in the DC itself. In addition, the design is based on constant output fluence for the DC and so the lengths and mixture in the FC have been adjusted to match this condition. The higher density of color segments (145) are located on the left hand side. Each of the four pump channels (148) are 0.25×1 meter. The color segmentation density on the FC preamp side is increased to account for the larger coupling constant in the FC preamp section. FIG. 13 shows the allocation of 4 channels across the FC sections to accommodate the crossing angle from the viewpoint of looking into the Fast Compressor from the Direct Compressor. Of course this may be adjusted for a given design. Also, the arrival time for each FC pump channel must be adjusted to coincide with the arrival of the FC extraction pulse. The crossing angle and the width of the FC sections set the differential arrival time. Table 6 gives these for the Preferred Embodiment.

Figure 10:
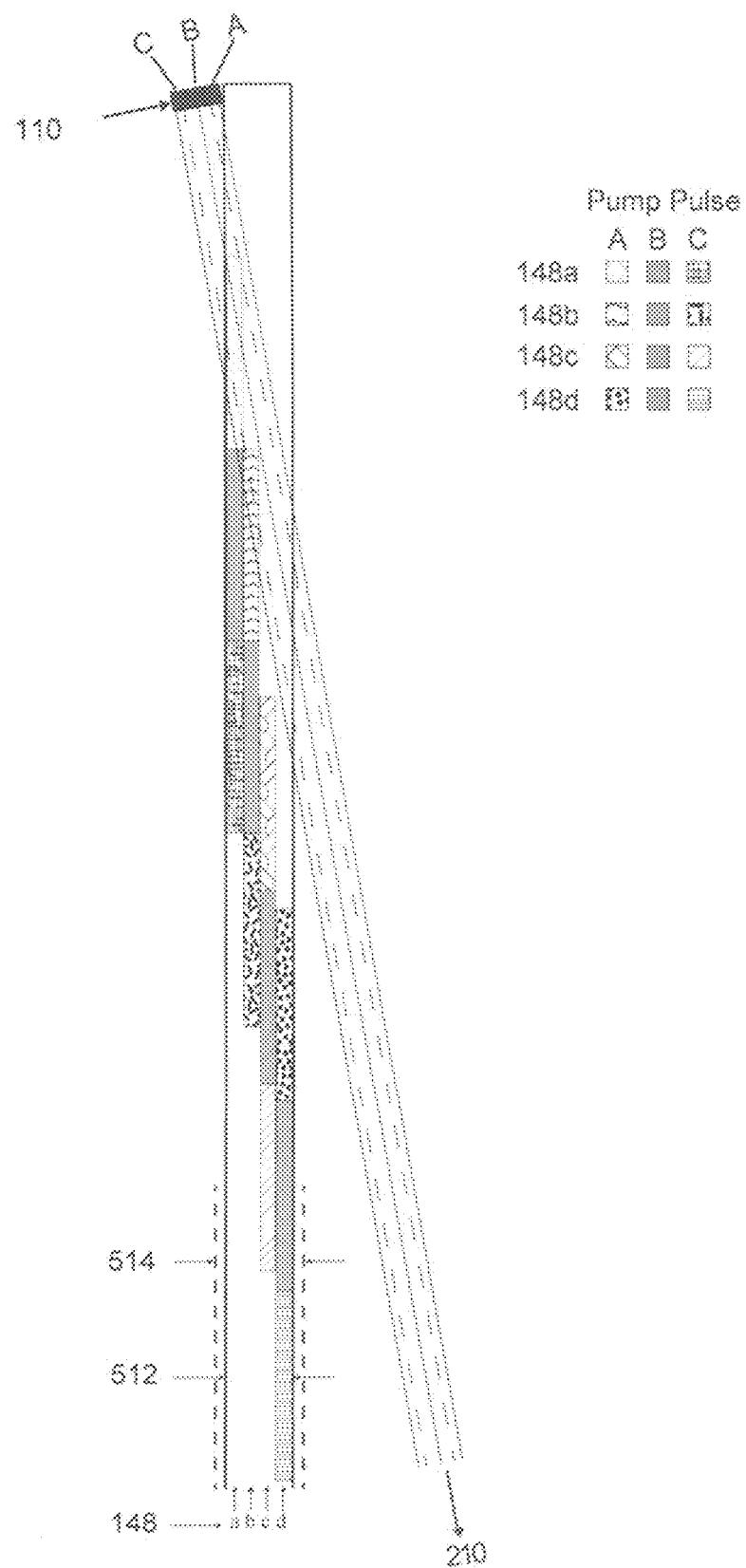
FIG. 10 illustrates an integration of the DC output pulse into the FC for the first architecture, and shows the location of the staggered DC channels at the time of entrance of the FC extraction pulse.

FIG. 10 shows the optical layout for the Fast Compressor (110), specifically the relative position of the FC extraction pulse (206, not shown) with the FC pump pulses (120, not shown) coming from the DC (142, not shown). Note that the DC extraction output pulse (that becomes the FC pump pulse once it reaches the FC (110)) consists of multiple channels (148) staggered in time (A, B, C). This is in accordance with the matching principle given in "Look-through Compression Arrangement," supra. In addition, as shown in FIGS. 12a-c, and 18, the FC output beam is changing in size as it focusses onto the target. This may be accommodated by shaping the output beam from the NSAC to become a trapezoid instead of a rectangle in cross section and thereby produce a trapezoidal DC output envelope in order to keep the optical coupling efficiency high. Once the output from the DC arrives at the FC, the same general extraction considerations, (primarily extraction efficiency and FASE), dictate the FC section design and transverse segment sizes. For this embodiment, 25 cm (square) was picked as a convenient segment size, and color segmentation was utilized for FC FASE segment isolation. Table 9 shows the color offsets in the FC array. There are two FC designs shown, one for a single color segment (Table 10), called a module, and one for a 3×4 array of segments pumped by a high energy DC output (FIGS. 12a-c, and Table 11). Because the depth of the 3×4 array is three times the depth of a module, the pulse length for the DC is three times longer and the total DC output fluence is 3 times larger for the array. Once the FC is pumped by the DC output, the FC extraction pulse converts the DC energy into its amplified output at high FC stage gain (notice a $G_{LS}$ of $1.2 \times 10^4$, Table 10), and then proceeds to the Vacuum Transition (112) and onto the Target (116). The FC stage also may convert a poorer beam quality DC pulse into a near diffraction limited output beam. In the case of the DC, the finite spatial coherence (characterized by $\theta_1$) may be utilized to ensure that the B integral is kept at low values. The B integral buildup may also be controlled by varying the section parameters. Thus, the DC beam is not as high a brightness as the FC output. A very high brightness FC output is very desirable in ICF to obtain both a good target standoff and target irradiance pattern. For the embodiment shown, the $1-3 \times 10^2$:1 ($10^2$ for pumping the full FC array, $3 \times 10^2$ for pumping the FC module) temporal compression of the DC and 10:1 of the FC leads to two directly coupled temporal compression stages with an overall 1000-3000:1 time compression ratio and much higher beam quality output then the original PLS and NSAC non temporally compressed stages. Also, these compressors may be operated with multiple widely separated colors simultaneously with the individual color performance largely divorced from that of other colors. The DC pump colors may be separated to provide multiline output. In addition, the DC may be utilized to generate multiple colors by operating on Raman transition as well as STMS, although the time compression efficiency product, $\eta_E C$, and saturation properties appear to make the present embodiment with STMS superior for this particular ICF application.

Fast Compressor

Figure 11:
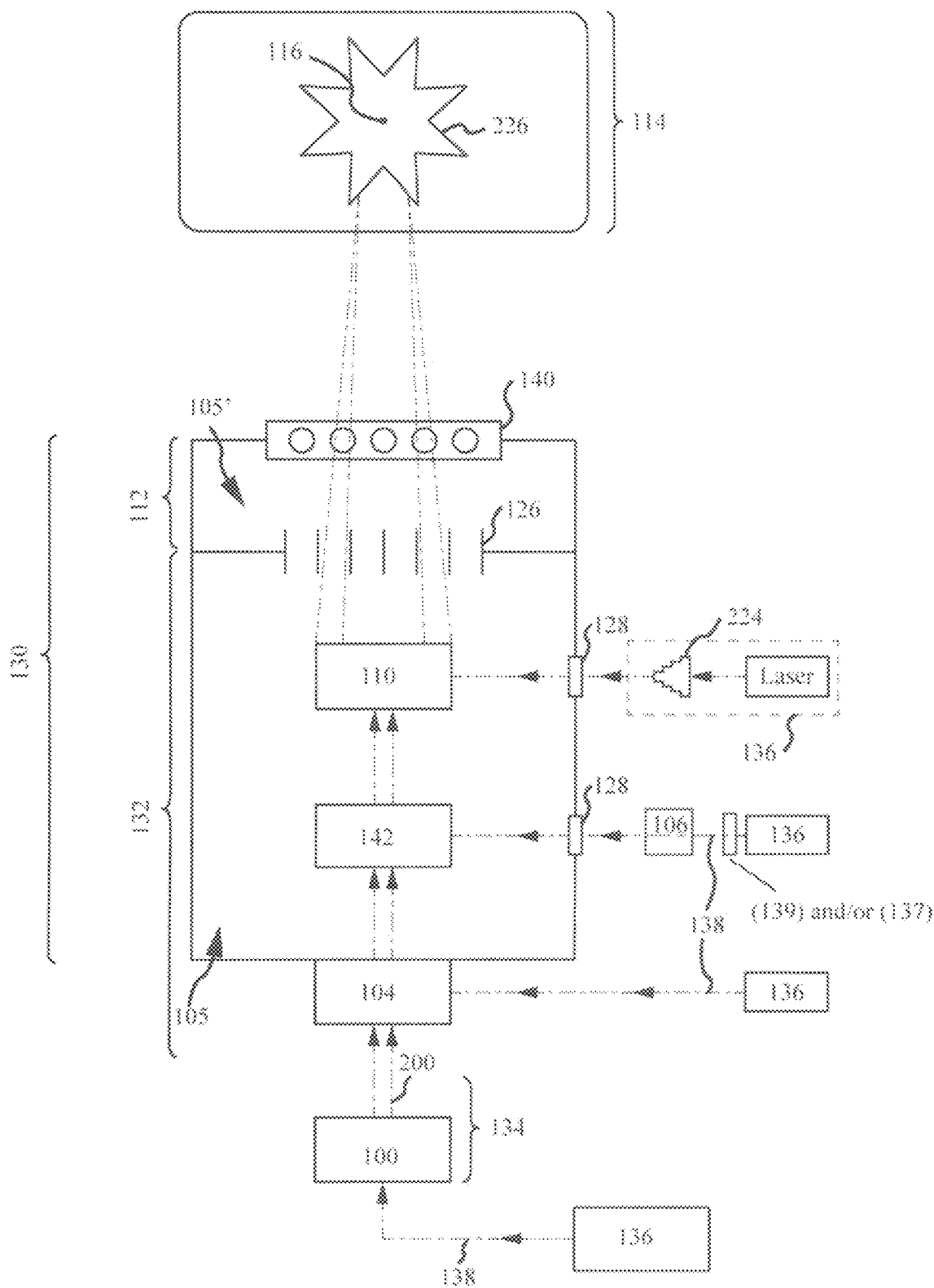
FIG. 11 shows a block design of the overall optical architecture for the Preferred Embodiment.

The Preferred Embodiment is based on the optical architecture exemplified in FIG. 11 as a case of FIG. 1. The performance and design embodiment, details are presented in some detail in the form of the Tables. The extraction and pump pulse analysis for the Fast Compressor and design parameters are shown in Tables 8 (simple 25 cm module)

and Table 11 (3×4 module array). This particular design has several criteria associated with it. First, it should be efficient and have high stage gain at the same time. The stage gain needs to be large enough so that the damage threshold on the input side ($\lesssim 1$ Joule/cm$^2$ for a $10^{-9}$ second extraction pulse) is observed. The efficiency is needed to keep the total cost of the overall compression apparatus and primary laser pump energy below the application requirement. The ICF application target cost for the embodiments shown is in the range of $10.00 per joule of energy delivered to the target. Second, the ASE losses should be minimized (kept in the 1% range), both for efficiency and for ensuring the energy does not couple to other modes of scattering. Third, the optical quality needs to be good for the ICF application to give target standoff and precise delivery of the energy as required by the target. Table 2 showed the basic performance of the overall elements. The following figures show how the interaction is organized and timed. The scattering cell arrangements are then presented and analyzed, particularly with regard to Amplified Spontaneous Emission (ASE).

The analysis shown is based on constant area interaction regions in the scattering cells. The spatial variation produced by the focusing in the compression regions is a matter of specific design; compensating adjustments purposes by treating the interaction regions in a collimated fashion. Various Innoven codes for the stage performance and ASE calculations were utilized.

Direct Compressor

The Direct Compressor to drive the Fast Compressor in a matched fashion overall is shown in Table 3. A design for a 4-cell section plus preamplifier design is presented. The output is 5.37 $\varepsilon_{SAT}$. For example, with 1.5×10$^7$ joules incident over 1 m$^2$, 1.5×10$^3$ joules/cm$^2$ =5.37 $\varepsilon_{SAT}$, or, $\varepsilon_{SAT}$=269 joules/cm$^2$. This requires the following cell design layout:

TABLE 3

DIRECT COMPRESSION STAGE (DCS) PARAMETERS

| | DCS - PA | DCS - 3 | DCS - 2 | DCS - 1 | DCS - 0 |
|---|---|---|---|---|---|
| DCS length (meters) | 18.6 | 14.9 | 40.0 | 107.4 | 288.2 |
| DCS $\gamma_c$ (cm/watt) | 8.77E-012 | 4.79E-012 | 1.79E-012 | 6.65E-013 | 2.48E-013 |
| DCS Medium (DCSM)[1] | .18 Ne/.82 N$_2$[2] | .4 He/.6 N$_2$[2] | .69 He/.31 N$_2$ | .97 Ne/.03 N$_2$ | .65 He/.35 Ne |

TABLE 3-continued

DIRECT COMPRESSION STAGE (DCS) PARAMETERS

| | DCS - PA | DCS - 3 | DCS - 2 | DCS - 1 | DCS - 0 |
|---|---|---|---|---|---|
| $G_C$ (cell gain) | 8 | 3.5 | 3.5 | 3.5 | 3.5 |
| $\eta_C$ (extraction efficiency) | 0.46 | 0.96 | 0.96 | 0.96 | 0.96 |

[1]Gas at standard temperature and pressure. Mixtures constituents given by partial pressures.
[2]The Raman Cross section may interfere with the STMS. If the Raman rotational transition interferes with STMS at these compression ratios, the N$_2$ may be isotopically mixed (N$_2$(15), N(14) N(15), N$_2$(14)) to lower the Raman cross section compared to the STMS, or Ar may be substituted for N$_2$. The N$_2$ is providing the coupling for the first ~50 meters. For the first section, the time compression ratio $$C = \frac{100 \text{ n.s.}}{30 \text{ n.s.}} \cong 3.3.$$

For Raman compression with a forward and backward Raman cross section ratio of 1, $\eta_C \cong 10$, so a value for $\eta_C$ of ≤4, there is a large margin. Either the isotopic substitution in the N$_2$ mixture or Ar substitution may be utilized if more margin is desired.

Figure 2:
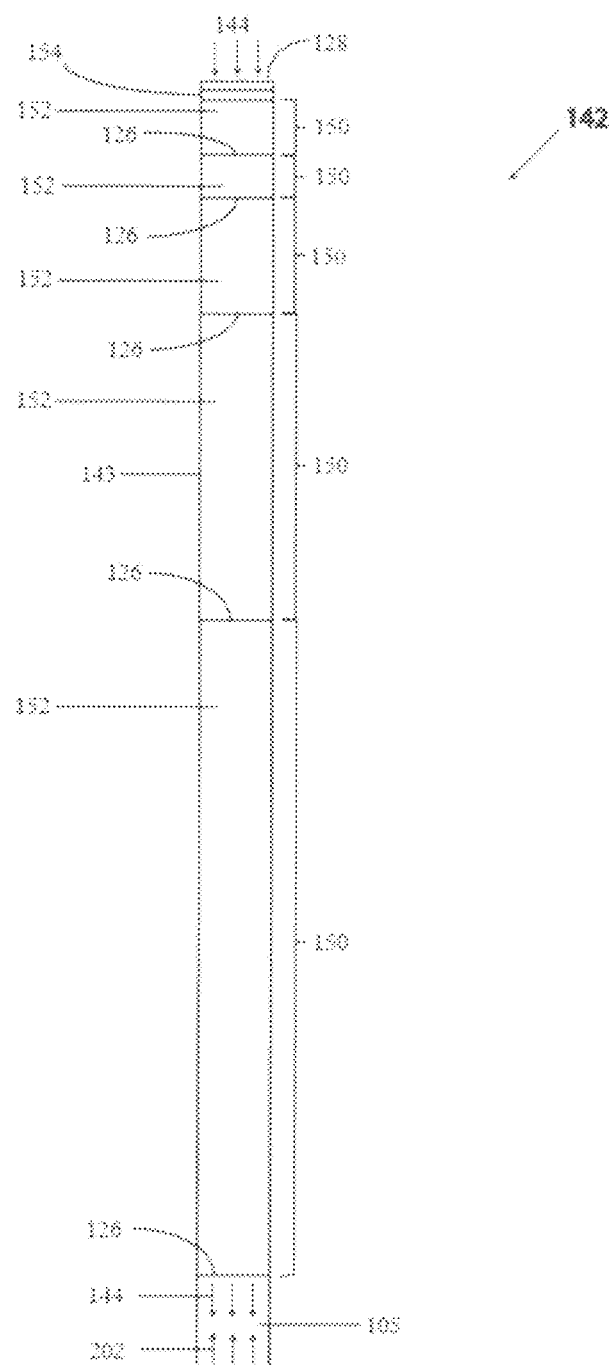
FIG. 2 shows the configuration of a 5-section Direct Compressor (DC) with in line drive from a Nonlinear Scattering Aperture Combiner (NSAC).
Figure 3:
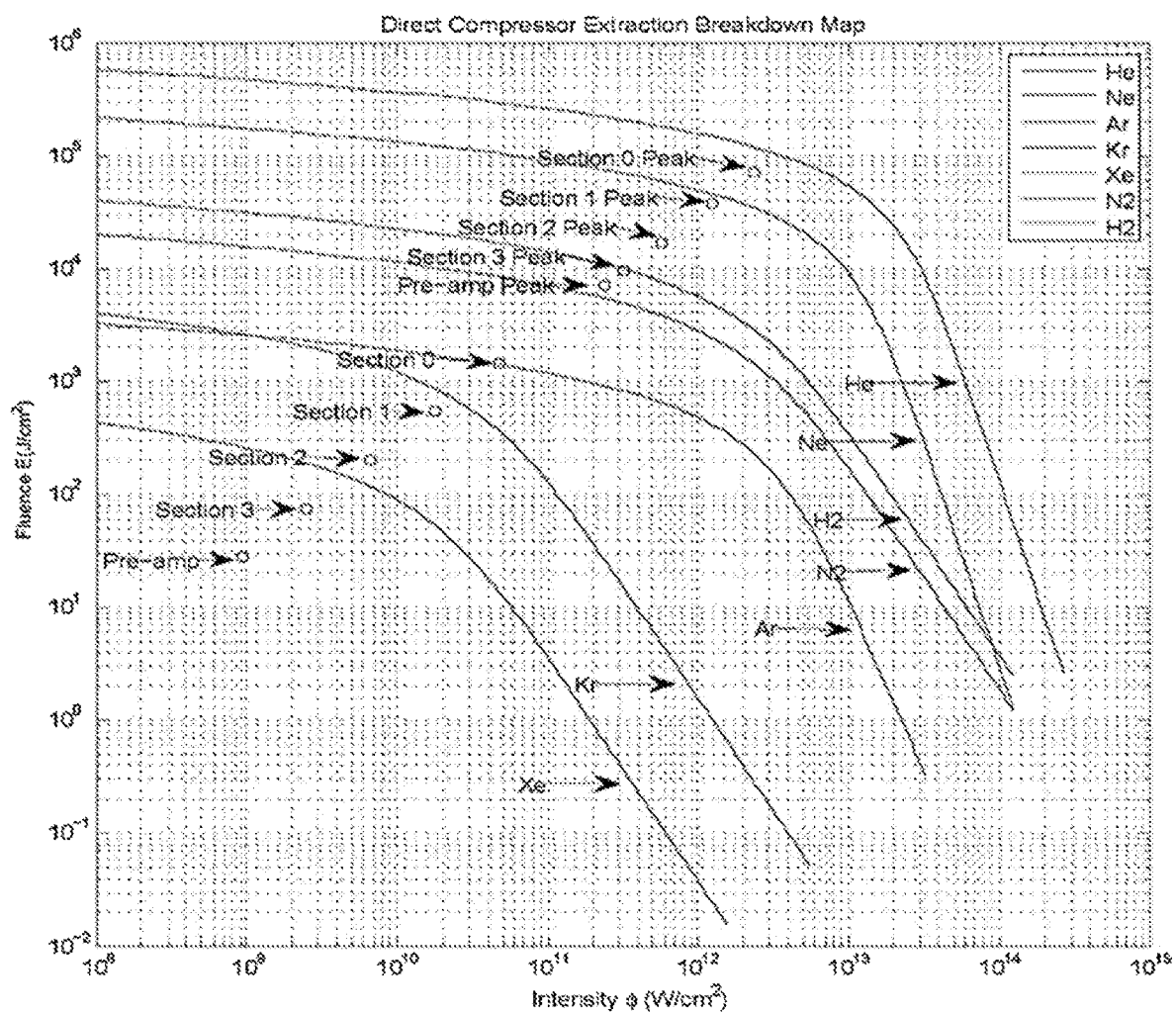
FIG. 3 shows operating points of extraction pulse optical fluence at the section exits of the reference Direct Compressor as compared to the breakdown fluence.
Figure 4:
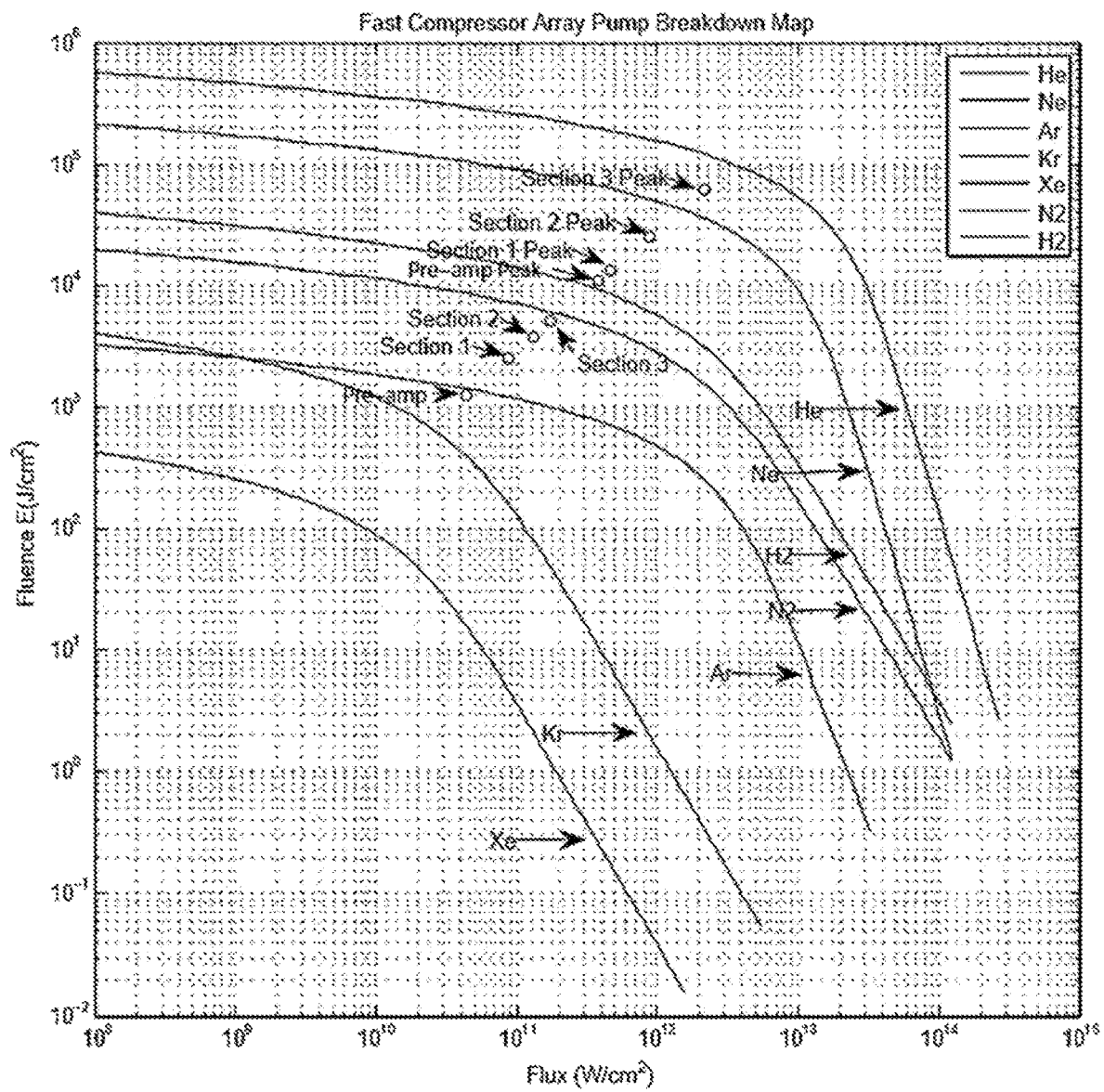
FIG. 4 shows operating points of pump pulse optical fluence at the section exits of the reference Direct Compressor as compared to the breakdown fluence.

FIG. 2 shows the layout of the Direct Compressor (142). The basic construction of the Direct Compressor (142) comprises a plurality of 5 meter mechanical type section lengths of Direct Compression Sections (150) flanged with vitron O-ring seals and ring braces at 1 meter intervals throughout the plurality of sections. The Direct Compressor Enclosure (143) is constructed of 303/304/316L stainless shell and has an inside pipe diameter (514, FIG. 10) of 1.75 meter. Each Direct Compressor Section Medium (152) is separated by vertical shutters (126) with 1 second opening times. The detailed and overall performance, including ASE losses, is shown in Table 4. Color segmentation is utilized for the DC extraction pulse. A summary of the key physics parameters was given in Table 2, and FIG. 3 shows the DC extraction pulse overlaid on a breakdown map, while FIG. 4 shows the DC pump pulse overlaid on a breakdown map. The ASE calculations show that the NSAC to DC pump pulse produces minimal ASE through the DC sections when run at a 1 m×1 m size, single color and, then, does not appear to require such treatment.

Figure 5:
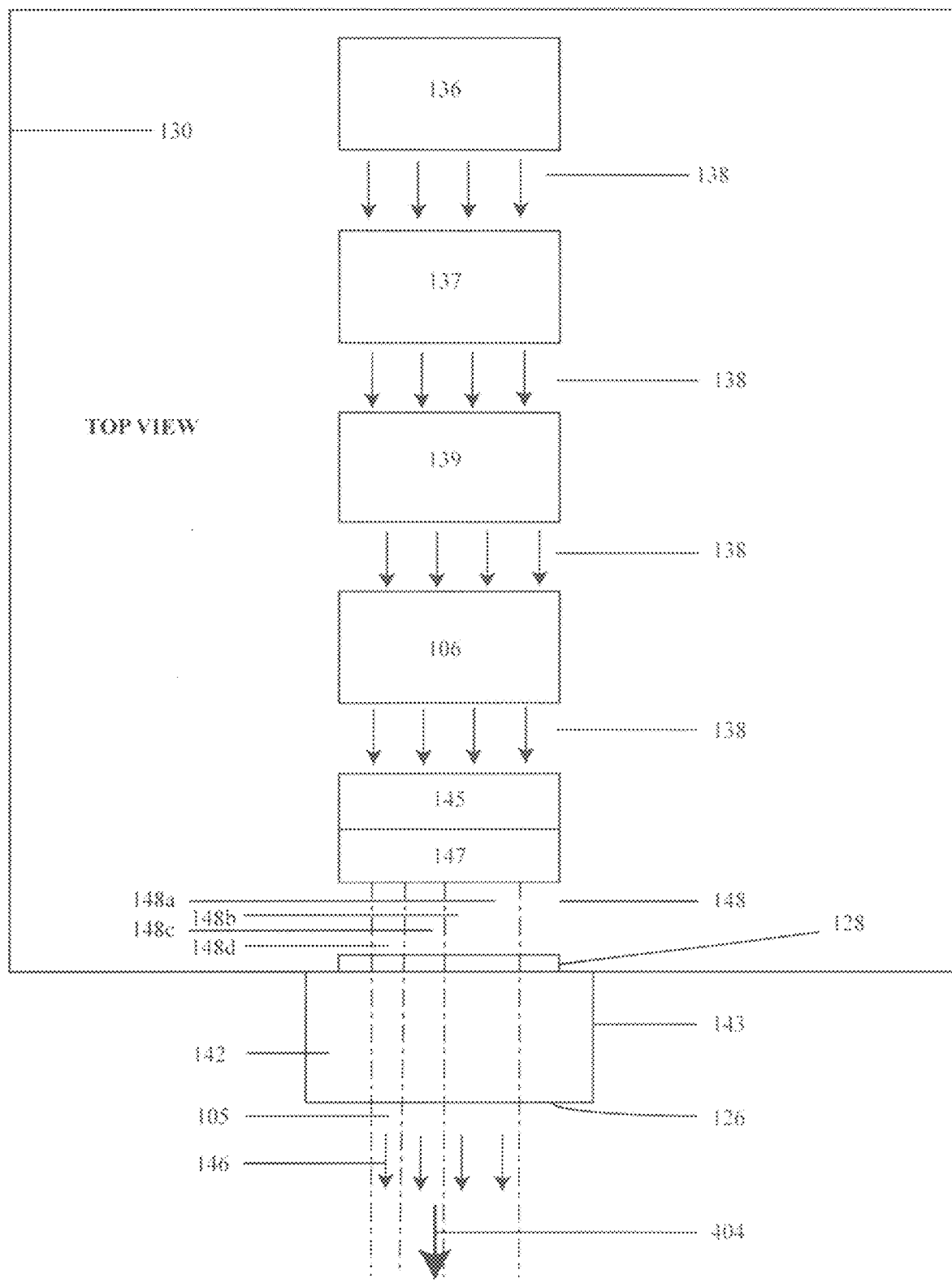
FIG. 5 illustrates formation of separate channels and color and/or polarization encoding for a Direct Compressor.

FIG. 5 shows the optical inputs to properly perform the color and/or polarization segmentation and arrange the segments in the correct time delayed channels. Direct Compressor (142) receives a plurality of Direct Compressor Channels (148) labeled as (148a, 148b, 148c, 148d) after being shaped by the Director Compressor Input Shaping Optics (147) and Channel and Segment Optics (145). Within Ambient Environment Enclosure (130), the Seed Laser Source (136) emits the Seed Laser Beam (138) which passes through the Polarization Encoder (137), Color Encoder (139) and Time Delay Section (106). The Direct Compressor Output Beams (146) exit the Direct Compressor Enclosure (143) by passing through the Propagation Gas (105) and onto the Fast Compressor (404). So in this case the Channel and Segment Optics (145) refers to either a color or polarization or color and polarization segmentation optic. FIGS. 6, 7, 8 and 9 schematic size color/geometry/color and polarization/geometrical and color segmentation of direct compressor channels.

TABLE 4

DIRECT COMPRESSOR PERFORMANCE

| Parameter | Pre-amp Section | Section 3 | Section 2 | Section 1 | Section 0 | Total |
|---|---|---|---|---|---|---|
| Gas | .18 Ne/.82 N2 | .4 He/.6 N2 | .69 He/.31 N2 | .97 Ne/.03 N2 | .65 He/.35 Ne | |
| $G_c$ (nepers) | 8 | 3.5 | 3.5 | 3.5 | 3.5 | 22 |
| $L_p$ (cm) | 1861 | 1490 | 4000 | 10737 | 28821 | 4.69E+004 |
| $G_{LS0}$ | 183 | 2.6844 | 2.6844 | 2.6844 | 2.6844 | 9.50E+003 |
| $G_e$ (saturation fluences) | 1.83 | 3.6844 | 3.6844 | 3.6844 | 3.6844 | |
| Exit Output Fluence (saturation fluences) | 3.6579 | 5.3688 | 5.3688 | 5.3688 | 5.3688 | |

TABLE 4-continued

DIRECT COMPRESSOR PERFORMANCE

| Parameter | Pre-amp Section | Section 3 | Section 2 | Section 1 | Section 0 | Total |
|---|---|---|---|---|---|---|
| $\gamma_{section}$ (cm/watt) | 8.77E−012 | 4.79E−012 | 1.79E−012 | 6.65E−013 | 2.48E−013 | |
| $\varepsilon_{sat}$ (joules/cm²) | 7.60 | 13.91 | 37.33 | 100.21 | 269.00 | |
| $\eta_E$ | 0.4572 | 0.9625 | 0.9625 | 0.9625 | 0.9625 | |
| $\eta_{OC}$ | 1 | 1 | 1 | 1 | 1 | 1 |
| $A_{optical}$ | 1.00E+004 | 1.00E+004 | 1.00E+004 | 1.00E+004 | 1.00E+004 | 1.00E+004 |
| Required Section Drive Energy (J) | 6.08E+005 | 4.87E+005 | 1.31E+006 | 3.51E+006 | 9.42E+006 | 1.53E+007 |
| Direct Compressor Extraction Pulse | | | | | | |
| $L_{gas}$ (cm) | 1861 | 1490 | 4000 | 10737 | 28821 | |
| $\varepsilon_{input}$ (joules/cm²) | 1.52E−001 | 27.8 | 74.7 | 200.4 | 538.0 | |
| $\varepsilon_{input}$ (saturation fluences) | 0.02 | 2.00 | 2.00 | 2.00 | 2.00 | |
| $\varepsilon_{output}$ (joules/cm²) | 27.8 | 74.7 | 200.4 | 538.0 | 1444.2 | |
| $\varepsilon_{output}$ (joules) | 2.78E+005 | 7.47E+005 | 2.00E+006 | 5.38E+006 | 1.44E+007 | |
| $\varepsilon$ output/$\varepsilon$ input | 182.8947 | 2.6844 | 2.6844 | 2.6844 | 2.6844 | |
| $\tau_{input}$ (seconds) | 3.00E−008 | 3.00E−008 | 3.00E−008 | 3.00E−008 | 3.00E−008 | |
| $A_0$ Color Segment Area (cm²) | 625 | 625 | 625 | 625 | 625 | 3125 |
| $A_0$ Total | 1.00E+004 | 1.00E+004 | 1.00E+004 | 1.00E+004 | 1.00E+004 | 1.00E+004 |
| Number of color segments | 1 | 1 | 1 | 1 | 1 | 5.00E+000 |
| Direct Compressor Pump Pulse | | | | | | |
| $L_{gas}$ (cm) | 1861 | 1490 | 4000 | 10737 | 28821 | |
| Color Segment Area (cm) | 1.00E+004 | 1.00E+004 | 1.00E+004 | 1.00E+004 | 1.00E+004 | 1.00E+004 |
| $\tau_{pump}$ (seconds) | 1.24E−007 | 9.93E−008 | 2.67E−007 | 7.16E−007 | 1.92E−006 | 3.13E−006 |
| $A_p$ Total (cm²) | 1.00E+004 | 1.00E+004 | 1.00E+004 | 1.00E+004 | 1.00E+004 | 1.00E+004 |
| Pump Flux (watts/cm²) | 4.90E+008 | 4.90E+008 | 4.90E+008 | 4.90E+008 | 4.90E+008 | 4.90E+008 |
| $\varepsilon_{pump}$ (joules/cm²) | 61 | 49 | 131 | 351 | 942 | 1532 |
| $\varepsilon_{pump}$ (joules) | 6.08E+005 | 4.87E+005 | 1.31E+006 | 3.51E+006 | 9.42E+006 | 1.53E+007 |
| ASE Losses | | | | | | |
| $FASE_{extraction}$ + Spontaneous (%)[3] | 2.60E−001 | 1.72E−001 | 4.87E−001 | 1.22E−001 | 9.64E−001 | |
| $BASE_{extraction}$ + Spontaneous (%)[3] | 2.29E−001 | 1.07E−001 | 1.03E−001 | 1.03E−001 | 1.13E−001 | |
| $FASE_{pump}$ + Spontaneous (%) | 1.81E−001 | 8.41E−002 | 7.95E−002 | 7.70E−002 | 4.71E−002 | |
| $BASE_{pump}$ + Spontaneous (%) | 1.12E−001 | 6.07E−002 | 4.55E−002 | 3.67E−002 | 3.15E−002 | |
| Extraction Pulse ASE Loss (J/cm²)[3] | 6.80E−002 | 1.43E−001 | 8.11E−001 | 8.31E−001 | 1.07E+001 | 1.25E+001 |
| Pump Pulse ASE Loss (J/cm²) | 1.78E−001 | 7.05E−002 | 1.63E−001 | 3.99E−001 | 7.40E−001 | 1.55E+000 |
| Total ASE Loss (J/cm²) | 2.46E−001 | 2.13E−001 | 9.75E−001 | 1.23E+000 | 1.14E+001 | 1.41E+001 |
| Extraction Pulse ASE Loss (J)[3] | 6.80E+002 | 1.43E+003 | 8.11E+003 | 8.31E+003 | 1.07E+005 | 1.25E+005 |
| Pump Pulse ASE Loss (J) | 1.78E+003 | 7.05E+002 | 1.63E+003 | 3.99E+003 | 7.40E+003 | 1.55E+004 |
| $FASE_{extraction}$ Peak ASE Angle (deg)[3] | 1.75E+000 | 1.23E+000 | 8.57E−001 | 8.57E−001 | 4.19E−001 | |
| $BASE_{extraction}$ Peak ASE Angle (deg)[3] | 1.75E+002 | 1.75E+002 | 1.75E+002 | 1.75E+002 | 1.75E+002 | |
| $FASE_{pump}$ Peak ASE Angle (deg) | 1.821 | 1.349 | 1 | 1 | 1 | |
| $BASE_{pump}$ Peak ASE Angle (deg) | 1.70E+002 | 1.67E+002 | 1.67E+002 | 1.69E+002 | 1.25E+002 | |
| $\eta_{ASE}$ | 0.9967 | 0.9979 | 0.9964 | 0.9983 | 0.9941 | |
| Energy Summary | | | | | | |
| Section Extraction Loss (J/cm²) | 33.00 | 1.83 | 4.90 | 13.15 | 35.31 | 88.18 |
| Section Extraction Loss (J) | 3.30E+005 | 1.83E+004 | 4.90E+004 | 1.32E+005 | 3.53E+005 | 8.82E+005 |
| Ideal Section Fluence (J/cm²) | 61 | 49 | 131 | 351 | 942 | 1.53E+003 |
| Ideal Section Energy (J) | 6.08E+005 | 4.87E+005 | 1.31E+006 | 3.51E+006 | 9.42E+006 | 1.53E+007 |
| Ideal Section Energy − Losses (J) | 2.76E+005 | 4.66E+005 | 1.25E+006 | 3.36E+006 | 8.95E+006 | 1.43E+007 |
| $\eta_{DC}$ | 0.4532 | 0.9581 | 0.9550 | 0.9590 | 0.9504 | 0.9333 |
| Total Loss (J/cm²) | 33.25 | 2.04 | 5.87 | 14.38 | 46.72 | 102.26 |
| Total Loss (J) | 3.32E+005 | 2.04E+004 | 5.87E+004 | 1.44E+005 | 4.67E+005 | 1.02E+006 |
| $G_{LS}$[4] | 181.2749 | 2.6767 | 2.6713 | 2.6783 | 2.6632 | 9.25E+003 |
| Nonlinear Optical Parameters | | | | | | |
| $B_{extraction\ pulse}$ (radians)[3] | 0.1477 | 0.3196 | 1.2011 | 1.0422 | 1.3382 | 4.0488 |
| $B_{pump\ pulse}$ (radians) | 0.1562 | 0.0917 | 0.1284 | 0.0415 | 0.0198 | 0.4376 |
| Pump $\theta_c$ (radians)[1] | 3.66E−005 | 3.13E−005 | 2.26E−005 | 1.54E−005 | 3.62E−006 | |
| Extraction $\theta_c$ (radians)[1] | 5.03E−005 | 7.06E−005 | 8.35E−003 | 9.30E−003 | 3.59E−003 | |
| Pump $\theta_l$ (radians)[2] | | | | | | 2.13E−005 |
| Extraction $\theta_l$ (radians)[2] | | | | | | 5.33E−004 |
| Extraction Peak Breakdown Fluence (J/cm²) | 7.11E+003 | 9.62E+003 | 1.71E+004 | 3.77E+004 | 7.00E+004 | |
| Pump Peak Breakdown Fluence (J/cm²) | 9.48E+003 | 1.13E+004 | 2.64E+004 | 7.26E+004 | 1.64E+005 | |
| Section Exit Fluence (J/cm²) | 2.78E+001 | 7.47E+001 | 2.00E+002 | 5.38E+002 | 1.44E+003 | |
| Pump Section Fluence (J/cm²) | 6.08E+001 | 1.09E+002 | 2.40E+002 | 5.91E+002 | 1.53E+003 | |
| Total Section Exit Fluence (J/cm²) | 8.86E+001 | 1.84E+002 | 4.41E+002 | 1.13E+003 | 2.98E+003 | |

[1] $\theta_c = 2\sqrt{(\Phi\eta_{20})}$
[2] Linear angle subtended by optical area. Using distance from NSAC to input of DC
[3] Using average section fluence
[4] Including losses The B integral is fairly large for this design. As shown in the art, in the range on 2-3, the Bespalov Talanov instability may become significant. However, due to the difficult $\eta_{2o}$ in each section, the peak growth may be restricted to that of a single section. In addition, the gas mixtures may be adjusted. Imaging properties in the DC are less important since we need only to drive the FC. Replacing nitrogen with argon in Section 1 would reduce the B integral.

We assume 99.999% purity in all gases, which leads to a $10^{-5}$ impurity level. This means trace hydrocarbon density is low enough that with 25 eV for each molecule, giving $7.075\times10^{-4}$ J/cm$^2$ plus an estimated $3\times10^{-4}$ J/cm$^2$ for low level inverse bremsstrahlung effects. This results in a total of 60 J/cm$^2$, or 4%, loss.

For forward ASE calculations, extraction pulses were run as 25 cm×25 cm squares. Backward ASE for extraction pulses, as well as pump pulses in both the forward and backward direction, were run as 25 cm diameter circles, except for color segmented pre-amp of the Fast Compressor array, which was run at a 10 cm diameter.

Figure 17:
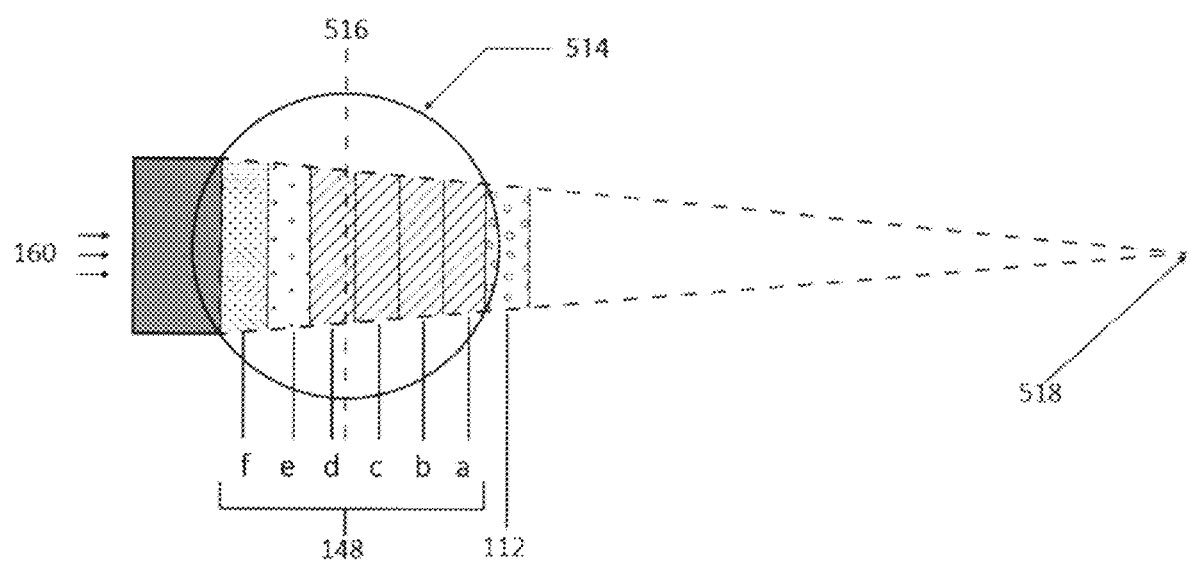
FIG. 17 shows the Target offset from Direct Compression when looking from Direct Compressor at FC, including Target position for a 6-pump channel version.
Figure 18:
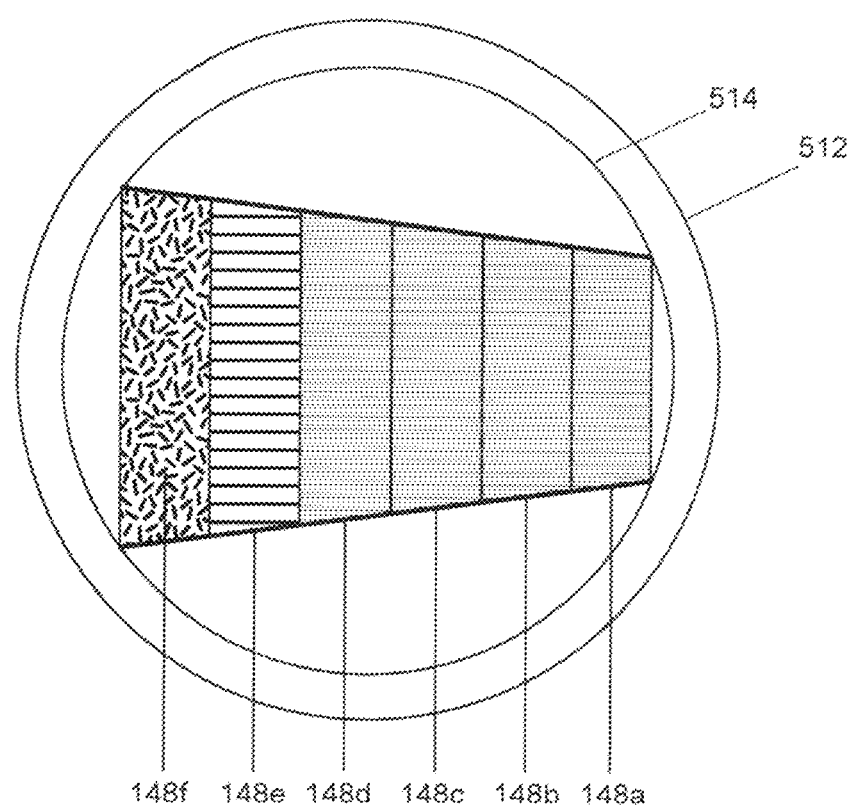
FIG. 18 shows taper across DC of size of DC extraction pulse channels to match with the FC geometry of FIG. 17 due to FC focusing onto Target.

The layout and calculations shown were for a collimated FC output geometry. In fact, the focusing onto the target by the FC will produce a tapered DC/FC interaction region. FIG. 17 illustrates the pump pulse envelope from the viewpoint of the extraction input pulses (160) at the interaction zone (at t=0) between the Fast Compressor (110, not shown) and Direct Compressor (142, not shown). It shows a tapered geometry allowing for the Vacuum Transition Section (112) and six pump channels (148a-f) around a center line (516), instead of the four in the computed design, having a 1.75 meter inside diameter of the pipe (514). FIG. 18 shows an illustrative view of the end of the Direct Compressor with the same geometry as FIG. 17. The outside diameter of the Pump Channel Envelope (512) measures 2 meter while the inside diameter of the pipe (514) measures 1.75 meters. FIG. 7 shows the actual computational geometry utilized in generating Table 4. FIG. 7 depicts the Direct Compressor Enclosure (143) with a 1 square meter array of Color Segments and their allocation to different channels (CH1, CH2, CH3, CH4). Table 4 geometry is for a uniform DC output fluence/flux.

Color Coding

The fundamental isolation condition for FASE coupling from one transverse color segment to another is the color separation be large enough so that the FASE produced in one section is not amplified appreciably in the adjacent segment. The approximate condition is that the peak gain angle, and hence Brillouin shift from the color in a given segment for the FASE, is given by $\tau_{ph}(\theta_p)\sim\tau$pulse. Here, $\tau_{ph}(\theta_p)$ is the phonon lifetime as a function of the Brillouin angle (angle between the incident beam and the FASE Brillouin amplified first Stokes). Since $$\tau_{ph} \equiv \frac{1}{2\pi\Delta v_B},$$

where $\Delta v_B$ is the FWHM of the Brillouin line, the above approximate criterion may be utilized to set the adjacent color segment shift in color as a function of the pulse length, $\tau$.

Detailed code computations should be performed prior to construction. The ASE values reported assume segment ASE decoupling and section decoupling. Polarization may also be utilized to isolate the FASE from one section to another. Consider two adjacent segments where the color offset is zero. Here, if linearly polarized, the extraction pulses in the two segments may have the electric field vectors orthogonal to one another (set at 90° offset) and then the growth ratio for FASE from one as amplified in the other may be substantially reduced and the two segments effectively isolated in terms of FASE.

TABLE 5

Selected Phonon Lifetimes ($\tau_{ph}$) as a Function of Angle for .25 micron wavelength light, and STP conditions. $\tau_{ph}(\theta)$ in nanoseconds, $\theta$ in degrees.

| gas | 1 | 2 | 3 | 4 | 5 | 6 | 7 | 8 | 9 | 10 |
|---|---|---|---|---|---|---|---|---|---|---|
| He | 16 | 4.2 | 1.9 | 1.1 | 0.72 | 0.51 | 0.39 | 0.32 | 0.27 | 0.23 |
| Ne | 51 | 13 | 5.9 | 3.4 | 2.2 | 1.5 | 1.15 | 0.9 | 0.72 | 0.61 |
| N$_2$ | 125 | 32 | 14 | 8.2 | 5.3 | 3.7 | 2.7 | 2.1 | 1.7 | 1.4 |
| Ar | 141 | 36 | 16 | 9.2 | 5.9 | 4.2 | 3.1 | 2.4 | 1.9 | 1.6 |

Table 5 was generated from the Averbakh formulation (see, for example, V. S. Averbakh, A. I. Makarov, and V. I. Talanov, "Stimulated Molecular Scattering of Light in Gases at Different Pressures," Soviet Journal of Quantum Electronics, Vol. 5, No. 10, pp. 1201-1206, 1976, incorporated by reference herein for all purposes) using viscosity data to provide an effective collision frequency.

Using the simple approximate criterion given above, for a 1 nanosecond pulse, the approximate peak angles for FASE are: He(~4°), Ne (~7.5°), N2 (~11°), Ar (~15°). One may estimate the needed color offset as roughly the Brillouin FWHM at that angle, for example, for a 1 nanosecond pulse, He (~1.5×108 Hz), Ne (~1.6×108 Hz), N2 (~1.5×108 Hz), Ar (~1.4×108 Hz) or, from the initial criterion, $$\Delta v_B \cong \frac{1}{2\pi\tau_{ph}} \cong \frac{1}{(2\pi)10^{-9}} \cong 1.6\times10^8 \text{ Hz}.$$

Assuming the scattering medium is the same in adjacent color segments, once the colors are separated by $\Delta v_{color} > \Delta v_B$, the adjacent cell coupling constant at that angle and frequency may be substantially less than in the originating segment. For the Preferred Embodiment, the Direct Compressor Extraction Pulse has almost a 30 nanosecond pulse length; hence the needed shifts may be smaller than the 1 nanosecond case given above. "Experimental Observation and Suppression of Transverse Stimulated Brillouin Scattering in Large Optical Components," J. R. Murray, J. R. Smith, R. B. Ehrlich, D. T. Kyrazis, C. E. Thompson, T. L. Weiland and R. B. Wilcox, Journal of the Optical Society of America B, Vol. 6, No. 12, December 1989, has mentioned (p. 2405) gain reduction due to SBS by a factor of as much as 2 by circular polarization or segmentation into "smaller areas of perpendicular linear polarization," as well as "One might also subdivide the aperture with absorbing barriers such that each individual sub-aperture has a growth time small enough to prevent SBS." The use of color and/or polarization segmentation as outlined herein eliminates the need for absorbing barriers and, in the version herein, may reduce the SBS by much more than a factor of two mentioned by Murray as long as the segment color separation is large enough. This version of polarization segmentation may be utilized to provide more than a factor of two isolation as well. The two methods may be combined.

For such segmentation and certain operating conditions, the FASE may be reduced to essentially that for a single color segment. For a backward conversion process in such gases as shown, the linewidths (FWHM) are He ($9.6 \times 10^9$ Hz), Ne ($4.2 \times 10^9$ Hz), N2 ($3.5 \times 10^9$ Hz), Ar ($3 \times 10^9$ Hz) at a 180° scattering angle. This implies that a color segment shift of $1.50 \times 10^8$ Hz for the extraction pulse may work without any color shift across the pump beam(s). Thus, color segmentation would be of value in a compression section pumped by a single color, and, in addition, should be of efficacy in pumping a backward scattering converter with a single color extraction and/or offset segments in the converter extraction pulse. This is due to the forward/backward linewidth asymmetry, the bandwidth for an extraction pulse of such a converter may be much larger (as shown above for the particular exemplary cases, a factor of 30-100 in linewidth and for efficient extraction, a factor of some 10-30) then the color offset in the segments of the pumping compressor.

The Preferred Embodiment DC design is for a 4×4 array of colors with a total shift of −600 MHz. The array is analyzed as 25 cm rectangles with the ASE computed for each segment separately. A −600 MHz shift in Neon and the early DC sections will serve to amplify the ASE from a given color segment only in that section. As the FASE propagates at an angle with peak gain due to the polarization response time for Brillouin scattering, it enters another color segment adjacent to the gain segment. The frequency change is large enough that, at that angle, it is no longer amplified and may be absorbed or have a path gain near 0 from then on. In addition, in one axis transverse to the direction of the extraction pulse propagation, the extraction channel pulses are staggered in time. This would also reduce the gain; however, it should be a weaker effect and only reduce the FASE growth; it is not in the calculations. FIG. 6 shows the color-coding arrangement used for the computations in the DC section. The higher density coding for ASE suppression in the FC will lower the DC value slightly.

In a given channel, the temporal characteristics are assumed the same in terms of the beginning and ending of the pulse. The full color modulation occurs throughout the pulse. From channel to channel, the beginning and ending times are different. Table 6 shows the differential shifts for a 10° crossing angle into the Fast Compressor. The channel shifts depend on the crossing geometry. By causality, channel 1 cannot affect channel 3 through small angle FASE. Thus, the vertical modulation may repeat across channels with sufficient transverse separation. Color sequencing in a given channel segment may also be utilized. The present design should have adequate modulation to ensure that the ASE component for a given segment will be isolated. The computations herein are based on this isolation technique. Others are possible, particularly given the ability to time vary polarization and color across all of the high fluence interfaces since specialized coatings and angles of optical elements are not present (polarization, chirping, etc.). The computational geometry utilized for the 3×4 array shown in FIG. 9 used a higher segmentation density in channel 4. The taper effects should be included as well.

TABLE 6

Color Segment Allocation to Channels and Differential Channel Time Delays Corresponding to Table 4 Direct Compressor and Fast Compressor

| Channel No. | Color Segments | Differential Time Delay |
|---|---|---|
| 1 | CS1, CS5, CS9, CS13 | 0 |
| 2 | CS2, CS6, CS10, CS14 | 4.73 nanoseconds |

TABLE 6-continued

Color Segment Allocation to Channels and Differential Channel Time Delays Corresponding to Table 4 Direct Compressor and Fast Compressor

| Channel No. | Color Segments | Differential Time Delay |
|---|---|---|
| 3 | CS3, CS7, CS11, CS15 | 9.46 nanoseconds |
| 4 | CS4, CS8, CS12, CS16 | 14.19 nanoseconds |

TABLE 7

Color Shift Corresponding to FIG. 6 Color Segmentation (Megahertz)

| CHANNEL 1 | CHANNEL 2 | CHANNEL 3 | CHANNEL 4 |
|---|---|---|---|
| −200 | −600 | −200 | −600 |
| CS1 | CS2 | CS3 | CS4 |
| 0 | −400 | 0 | −400 |
| CS5 | CS6 | CS7 | CS8 |
| −600 | −200 | −600 | −200 |
| CS9 | CS10 | CS11 | CS12 |
| −400 | −0 | −400 | 0 |
| CS13 | CS14 | CS15 | CS16 |

The front end delivers input pulses with aggregate energy of over $10^3$ joules, with color separations as previously shown. They are tailored in time to give constant output power at the end of the DC. The time sequence is two $10^{-8}$ second pulses back-to-back for a two-deep array (2×4) or one $2 \times 10^{-8}$ second pulse, and three $10^{-8}$ second pulses back to back to give one $3 \times 10^{-8}$ second pulse/pump channel for the Preferred 3×4 array. The centerline frequency should be stable to within 50 MHz over the pulse and the bandwidth (FWHM) may be 150 MHz. The energy is injected on separate optical channels and is imaged as described in the next section.

One major aspect of this design is the need to prevent damage to the input optics for the NSAC (104) and the DC (142), as shown in FIG. 24. At the same time, the optical coupling efficiency to the next stage, NSAC (104) to DC (142) and DC (142) to FC (110) needs to be kept high. This design is based on imaging the output of the NSAC on the support of the input optics of the DC and the output of the DC on the input optics of the NSAC. A 1 square meter pattern of the Direct Compressor Input Beam (144), enlarged to show the input optic elements, is imaged onto the Fast Compressor (110) and the 1 square meter pattern of the NSAC Input (122) is imaged at the NSAC (104). The pattern may be altered to suit NSAC amplifying characteristics. The input optics in both cases are broken up into a number of small optical elements to make up 1 square meter.

A second condition is met simultaneously by imaging a shaped pupil at the DC input optics onto the desired pump spatial shape at the FC region to ensure high optical coupling efficiency. Likewise, the NSAC output beam, though not color-segmented, should be shaped to provide high optical coupling efficiency to the DC extraction. For this design, the NSAC output beam is time stationary. The operating fluence over 1 m² is $1.2-1.5 \times 10^7$ joules/m². If nothing is converted, this full energy could impinge on the input optics of the D.C. Thus, the optical quality of the DC path needs to be good enough to support $10^2$-$10^3$:1 contrast at the DC input optics plane, including diffractive effects. If conversion takes place, about 5% of the incident light is left, and the ratio falls to ~10:1.

The propagation region is a region in which the optical input can spatially expand for the segments and overlap. Likewise, the NSAC region is displaced from the NSAC input optics plane. There are a variety of techniques. Disposable or grazing angle optics seems simplest. Other protection techniques include: high STMS or Raman gain sections in front of the input optic plan to extract the light optically in a perpendicular or ASE direction; active ASE amplifications in such sections; active absorbing regions (electrical breakdown, optically pumped); and switches based on transient mirror formation to inject the signals and decay away before the damaging light arrives back. In addition, a light guide geometry is shown later (FIG. 26) where the NSAC/PLS and DC output beams are offset in angle.

As an alternative to the above imaging arrangement is to utilize disposable flat segments to inject the signals into the FC and DC. For small aperture flats with relaxed flatness tolerances, the cost per shot would be acceptable (~$1,000.00) and the optical train FC and DC imaging could be optimized for a high optical coupling efficiency, without constraints due to the damage to the input optics. FIG. 25 shows such an arrangement. FIG. 25 diagrams an input arrangement to the Nonlinear Scattering Aperture Combiner, NSAC, (122) designed to prevent high energy unconverted output from the direct compressor (not shown) from damaging main or injection primary laser source optics (not shown). Beam dump (155) has intermittent openings allowing unobstructed passage of primary laser source beams (135) that serve as NSAC inputs (408).

Figure 26:
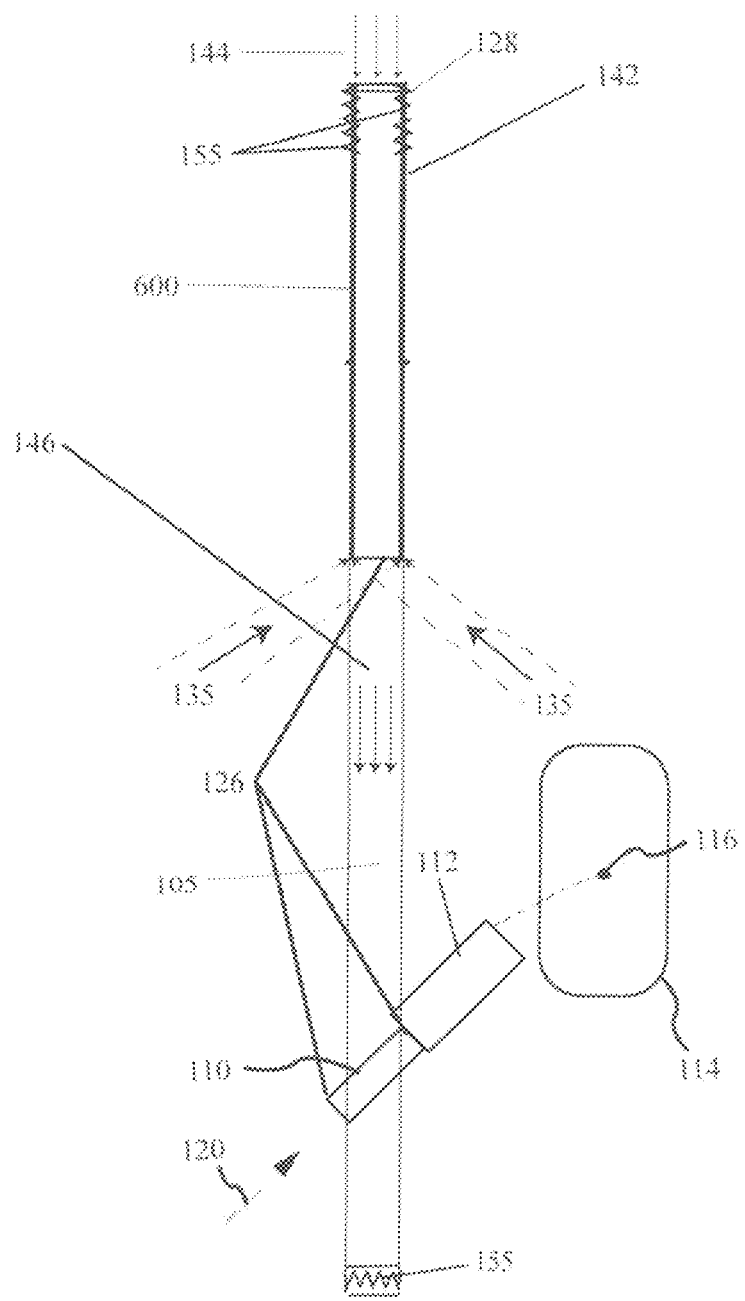
FIG. 26 shows a light guide arrangement to prevent optical damage in DC.

Another main alternative is to make the DC pipe into a light guide. See FIG. 26. Here, mirrors (600) are placed near the boundaries of the envelope of the pump and extraction pulses. This geometry has several advantages:
(1) The FC/DC intersection region may be removed from the NSAC pump beam.
(2) The optical coupling efficiencies for the NSAC to the DC and the DC to the FC may be optimized without careful attention to the imaging properties of the respective optical trains.
(3) The constraints due to damage at high fluences to the NSAC and DC optics may be removed by offsetting the pump and extraction pulse optical paths. The reflective surface would preferably have high reflectivity at the $2\times10^{-3}$ radian) (~0.1° incident angle and poor reflectivity at ~1° angle for the ASE. FIG. 26 shows such an arrangement. ASE suppression techniques may also be utilized.

For the mapped option, the DC high stage gain means that the injecting optics do not need to occupy a large area, as shown in FIGS. 24 and 26. This arrangement presupposes a chirping/color ASE suppression method. ASE control by segmentation may be utilized as well. Intervening beam-shaping optics are used to provide efficient fill of input optics (otherwise ~x10 insertion loss). The spatial coherence of the individual color segments may be utilized to control nonlinear instability growth (see, for example, R. O. Hunter, "Design Physics Summary", RPT-ROH-20150716, Innoven Energy LLC, 2015, [R4]). However, there is still a nonlinear index contribution due to nonuniformities in the intensity. Since the DC sections are acting as saturated amplifiers, the major contribution will be pump nonuniformity from the NSAC. Assuming no nonlinear optical growth, the B-integral is estimated and shown, as are the breakdown values, in Table 4.

Fast Compressor

The Fast Compressor is based on a four-section stage with backward STMS conversion from the input pump beams out of the Direct Compressor. The optical quality of the output needs to be good. The target requirement is that it be able to project 100 µm features in a spot array with a relatively high degree of uniformity. FIGS. 12a-c show the FC target layout. The 3×4 input array measures 0.75×1.0 meters. The focal length is 30 meters to target. Immediately after the input array, the interaction region amplifies the input beam with a gain, $G_{LS}$, of almost $10^4$. The input fluence of 0.15 joules/cm$^2$ is amplified to ~$15\times10^3$ joules/cm$^2$ through a total extraction path length of some 6 meters. The output is directed to the Vacuum Transition Section and proceeds on to the target. The twelve 25×25 cm segments of the input array are color-coded, as in the DC, to isolate one segment from another in terms of ASE. The crossing angle of 10° has several implications. Larger crossing angles tend to have less ASE and B-Integral problems, but place more constraints on the DC output to the shorter pump pulse. An adaptive optics (AO) unit is associated with each 25×25 cm segment and is utilized for slow (~10 Hz) correction of index and mechanical drifts and fine alignment of the projected pattern to the target. Its input signal is derived from a low power laser signal coming from the target. The output of each segment is an image of the spot array. The 12 segments are overlaid on the target. In addition, the AO system can acquire phase maps over a fast timescale ($10^{-6}$ seconds) to ensure the Vacuum Transition Section is not introducing an unacceptable level of unrepeatable and/or small-scale path index fluctuations. The AO may then be utilized on a slow time scale to correct for repeatable VT phase errors.

FIGS. 10 and 13 show the basic integration with the Direct Compressor and the mapping of the pump beams from the DC onto the FC sections. The optical area is 0.5 m$^2$ at the entrance (t=0). The optical envelope shown in FIG. 19 indicates where the various pump channels are spatially registered when the Extraction Pulse (160) encounters them for a 2×4 extraction array and a 6 channel pump (148a-f). The Extraction Pulse (160) at the entrance (at t=1 nanosecond) and then again as it enters the Vacuum Transition Section (112) (at t=23 nanoseconds). The FC operates as an imaging amplifier and produces a target irradiance pattern that is found in its front end and then imaged onto the target. The different parts of the image (occupying about 2 cm at the 30 m focal length) traverse a near common path through the FC. ASE suppression is provided by color segmentation. The color coding of the input pulses in the FC is shown in Table 9.

The preferred design has the target horizontally mounted with the DC pipe. One variant has the Target located above the DC in order to eliminate the shutter/flow boundaries for the FC section. Temperature and gradient control to within 1° C. is needed to reduce eddy mixing and maintain convective stability.

It should be noted that the calculations presented are for collimated FC and DC beams. The desired tailoring, due to the focusing in the interaction regions may result in a different geometry. The performance and design above and in Table 5 are for a collimated computational geometry.

TABLE 8

FAST COMPRESSOR OPTICAL PUMP AND EXTRACTION PARAMETERS FROM DIRECT COMPRESSOR

| FC SECTION | PA | 1 | 2 | 3 |
|---|---|---|---|---|
| Section Channel Allocation | .5 Channels | .32 Channels | .86 Channels | 2.32 Channels |
| $G_0$ | 8 | 3.5 | 3.5 | 2.5 |
| Gas | .68 Ne/.32 $N_2$ | .78 Ne/.22 $N_2$ | .97 Ne/.03 He | .9 He/.1 $N_e$ |
| $\gamma_c$ (cm/watt) | 2.53E−012 | 1.72E−012 | 6.41E−013 | 1.71E−013 |
| $A_0$ (cm$^2$) (Average Optical Area-FC Extraction) | 7500 | 7500 | 7500 | 7500 |
| $L_p$ (cm) | 72 | 46 | 124 | 333 |
| $A_p$ (cm$^2$) (Averaged Optical Area-Pump) | 1250 | 803.46 | 2156.8 | 5789.72 |
| $E_{pump}$ (joules) | 1.58E+006 | 10.2E+006 | 2.73E+006 | 7.33E+006 |
| $\tau_p$ (seconds) | 2.88E−008 | 2.88E−008 | 2.88E−008 | 2.88E−008 |
| Pump Flux (watts/cm$^2$) | 4.40E+010 | 4.40E+010 | 4.40E+010 | 4.40E+010 |

TABLE 9

COLOR CODING/COLOR SEGMENTING OF INPUT TO FAST COMPRESSOR (3 × 4 ARRAY) (LOOKING TOWARDS TARGET)

| | | |
|---|---|---|
| −1 GHz | 0 | −1 GHz |
| −750 MHz | −500 MHz | −750 MHz |
| 0 | −1 GHz | 0 |
| −750 MHz | −500 MHz | −750 MHz |

For a crossing angle of 10°, FIG. 17 indicates the pump channel for a 6 channel pump envelopes looking into the FC from the DC end. Note how the focusing changes the pump channel height. From the centerline of the pipe, the target is located 4.75 meters radially.

Fast Compressor Module

Just as in the DC design a FC module based on the 25 cm color segment size may be designed using a unit cell array with a preamplifier section. The design and performance parameters for such a design is shown in Table 10. These modules may then be stacked four high and three deep to give the full $10^{7+}$ joule output energy.

TABLE 10

FAST COMPRESSOR MODULE PERFORMANCE
(Single 25 cm × 25 cm Module)

| Parameter | Pre-amp Section | Section 1 | Section 2 | Section 3 | Transition | Total |
|---|---|---|---|---|---|---|
| Gas | .68 Ne/.32 N2 | .78 Ne/.22 N2 | .97 Ne/.03 N2 | .9 He/.1 Ne | He | |
| $G_c$ (nepers) | 8.00 | 3.5 | 3.5 | 2.5 | | 17.5 |
| Lp (cm) | 72.00 | 46.28 | 124.23 | 333.49 | 147 | 5.76E+002 |
| $G_e$ (saturation fluences) | 1.48 | 3.6844 | 3.6844 | 2.9379 | | |
| $G_{LS0}$ | 5.91E+002 | 2.6844 | 2.6844 | 2.6484 | | 1.13E+004 |
| Exit Output Fluence (saturation fluences) | 2.9573 | 5.3688 | 5.3688 | 3.7952 | 5.3688 | |
| $\gamma_{section}$ (cm/watt) | 2.53E−012 | 1.72E−012 | 6.41E−013 | 1.71E−013 | 1.44E−013 | |
| $\varepsilon_{sat}$ (joules/cm$^2$) | 26.38 | 38.75 | 104.02 | 390.92 | 462.99 | |
| Module Width (cm) | 25 | 25 | 25 | 25 | 25 | 125 |
| Gas Width (cm) | 12.5 | 8.03 | 21.57 | 57.90 | | 100 |
| $\eta_E$ | 0.35 | 0.96 | 0.96 | 0.91 | | |
| $\eta_{OC}$ | | | | | | 0.89 |
| $A_{optical}$ | 625 | 625 | 625 | 625 | 625 | |
| Required Section Drive Energy (J) | 131875 | 84765.03 | 227542.4 | 610815.46 | | 1.05E+006 |
| Fast Compressor Extraction Pulse | | | | | | |
| $L_{gas}$ (cm) | 144.00 | 92.56 | 248.46 | 666.97 | 294.12 | |
| $\varepsilon_{input}$ (joules/cm$^2$) | 1.32E−001 | 77 | 208 | 560 | 1484 | |
| $\varepsilon_{input}$ (saturation fluences) | 5.00E−003 | 2.00E+000 | 2.00E+000 | 1.43E+000 | 3.20E+000 | |
| $\varepsilon_{output}$ (joules/cm$^2$) | 78 | 208 | 558 | 1484 | 1484 | 1.48E+003 |
| $\varepsilon_{output}/\varepsilon$ input | 591.4692 | 2.6844 | 2.6844 | 2.6484 | 1.0000 | |
| $\tau_{input}$ (seconds) | 1.00E−009 | 1.00E−009 | 1.00E−009 | 1.00E−009 | 1.00E−009 | |
| $A_0$ (cm$^2$) | 625 | 625 | 625 | 625 | 625 | |
| $A_0$ Color Segment Area (cm$^2$) | 625 | 625 | 625 | 625 | 625 | 3125 |
| Number of color segments | 1 | 1 | 1 | 1 | 1 | 5 |
| Fast Compressor Pump Pulse | | | | | | |
| $\tau_{pump}$ (seconds) | 9.60E−009 | 9.60E−009 | 9.60E−009 | 9.60E−009 | | 3.84E−008 |
| # of Channels | 5.00E−001 | 3.21E−001 | 8.63E−001 | 2.32E+000 | | 4.00E+000 |
| $A_p$ (cm$^2$) | 312.50 | 200.87 | 539.20 | 1447.43 | | 2500 |
| $\varepsilon_{pump}$ (joules/cm$^2$) | 422.00 | 422.00 | 422.00 | 422.00 | | |
| $\varepsilon_{pump}$ (joules) | 1.32E+005 | 8.48E+004 | 2.28E+005 | 6.11E+005 | | 1.05E+006 |
| Pump Flux (watts/cm$^2$) | 4.40E+010 | 4.40E+010 | 4.40E+010 | 4.40E+010 | | |

TABLE 10-continued

FAST COMPRESSOR MODULE PERFORMANCE
(Single 25 cm × 25 cm Module)

| Parameter | Pre-amp Section | Section 1 | Section 2 | Section 3 | Transition | Total |
|---|---|---|---|---|---|---|
| ASE Losses | | | | | | |
| $FASE_{extraction}$ + Spontaneous (%)[5] | 1.98E−002 | 1.45E−002 | 5.53E−002 | 1.02E+000 | 1.92E−001 | |
| $BASE_{extraction}$ + Spontaneous (%)[5] | 5.60E−003 | 3.59E−003 | 3.86E−003 | 2.14E−003 | 8.82E−004 | |
| $FASE_{pump}$ + Spontaneous (%) | 1.45E−002 | 5.27E−003 | 9.92E−004 | 1.80E−004 | | |
| $BASE_{pump}$ + Spontaneous (%) | 3.08E−003 | 3.54E−004 | 1.10E−003 | 6.80E−004 | | |
| Extraction Pulse ASE Loss (J/cm$^2$)[5] | 9.91E−003 | 2.58E−002 | 2.27E−001 | 1.17E+001 | 2.86E+000 | |
| Pump Pulse ASE Loss (J/cm$^2$) | 7.41E−002 | 2.37E−002 | 8.81E−003 | 3.63E−003 | | |
| Extraction Pulse ASE Loss (J)[5] | 6.20E+000 | 1.61E+001 | 1.42E+002 | 7.34E+003 | 1.79E+003 | 9.29E+003 |
| Pump Pulse ASE Loss (J) | 2.32E+001 | 4.77E+000 | 4.75E+000 | 5.26E+000 | | 3.79E+001 |
| $FASE_{extraction}$ Peak ASE Angle (deg)[5] | 2.15E+001 | 3.07E+001 | 1.50E+001 | 7.34E+000 | 1.05E+001 | |
| $BASE_{extraction}$ Peak ASE Angle (deg)[5] | 9.01E+001 | 9.01E+001 | 9.01E+001 | 9.01E+001 | 9.01E+001 | |
| $FASE_{pump}$ Peak ASE Angle (deg) | 10.986 | 10.986 | 11.753 | 11.369 | | |
| $BASE_{pump}$ Peak ASE Angle (deg) | 1.70E+002 | 9.00E+001 | 1.69E+002 | 1.65E+002 | | |
| $\eta_{ASE}$ | 0.9998 | 0.9999 | 0.9997 | 0.9925 | 0.9981 | |
| Energy Summary | | | | | | |
| Extraction Loss (J/cm$^2$) | 133 | 5 | 15 | 88 | | 240.94 |
| Extraction Loss (J) | 8.31E+004 | 3.39E+003 | 9.10E+003 | 5.50E+004 | | 1.51E+005 |
| Ideal Section Fluence (J/cm$^2$) | 211 | 136 | 364 | 977 | | 1.69E+003 |
| Ideal Section Energy (J) | 1.32E+005 | 8.48E+004 | 2.28E+005 | 6.11E+005 | | 1.05E+006 |
| Ideal Section Energy − Losses (J) | 4.87E+004 | 8.14E+004 | 2.18E+005 | 5.48E+005 | | 8.97E+005 |
| $\eta_{FC}$ | 0.3692 | 0.9598 | 0.9594 | 0.8998 | 0.9981 | 0.8501 |
| Total ASE Loss (J/cm$^2$) | 8.40E−002 | 4.96E−002 | 2.36E−001 | 1.17E+001 | 2.86E+000 | 1.50E+001 |
| Total ASE Loss (J) | 2.94E+001 | 2.09E+001 | 1.46E+002 | 7.34E+003 | 1.79E+003 | 9.33E+003 |
| $G_{LS}{}^4$ | 590.8322 | 2.6838 | 2.6833 | 2.6275 | | 1.12E+004 |
| Nonlinear Optical Parameters | | | | | | |
| $B_{extraction\,pulse}$ (radians) | 0.1791 | 0.3117 | 0.3755 | 0.4974 | 0.2740 | 1.6378 |
| $B_{pump\,pulse}$ (radians) | 0.2017 | 0.0960 | 0.0431 | 0.0190 | | 0.3598 |
| Pump $\theta_c$ (radians)[1] | 2.11E−004 | 1.82E−004 | 7.32E−005 | 3.02E−005 | | |
| Extraction $\theta_c$ (radians)[1] | 2.81E−004 | 3.95E−004 | 2.61E−004 | 1.75E−004 | 1.72E−004 | |
| Pump $\theta_I$ (radians)[3] | | | | | | [2]3.33E−04 |
| Extraction $\theta_I$ (radians)[3] | | | | | | 4.34E−002 |
| Extraction Peak Breakdown Fluence (J/cm$^2$) | 4.39E+003 | 5.08E+003 | 8.14E+003 | 1.78E+004 | 2.00E+004 | |
| Pump Peak Breakdown Fluence (J/cm$^2$) | 1.11E+004 | 1.34E+004 | 2.56E+004 | 6.18E+004 | | |
| Section Exit Fluence (J/cm$^2$) | 7.80E+001 | 2.08E+002 | 5.58E+002 | 1.48E+003 | 1.48E+003 | |
| Pump Section Fluence (J/cm$^2$) | 4.22E+002 | 8.44E+002 | 1.27E+003 | 1.69E+003 | | |
| Total Section Exit Fluence (J/cm$^2$) | 5.00E+002 | 1.05E+003 | 1.82E+003 | 3.17E+003 | 1.48E+003 | |

[1]$\theta_C = 2\sqrt{(\Phi\eta_{20})}$
[2]1 cm irradiance pattern at 30 m
[3]Linear angle subtended by optical coupling region (radians)
[4]Including losses
[5]Using average section fluence
Note:
Gas absorption is treated separately.

For forward ASE calculations, extraction pulses were run as 25 cm×25 cm squares. Backward ASE for extraction pulses, as well as pump pulses in both the forward and backward direction, were run as 25 cm diameter circles, except the color segmented pre-amp of the fast compressor array, which was run at a 10 cm diameter.

The Fast Compressor Module and Array (3×4).

Figure 14:
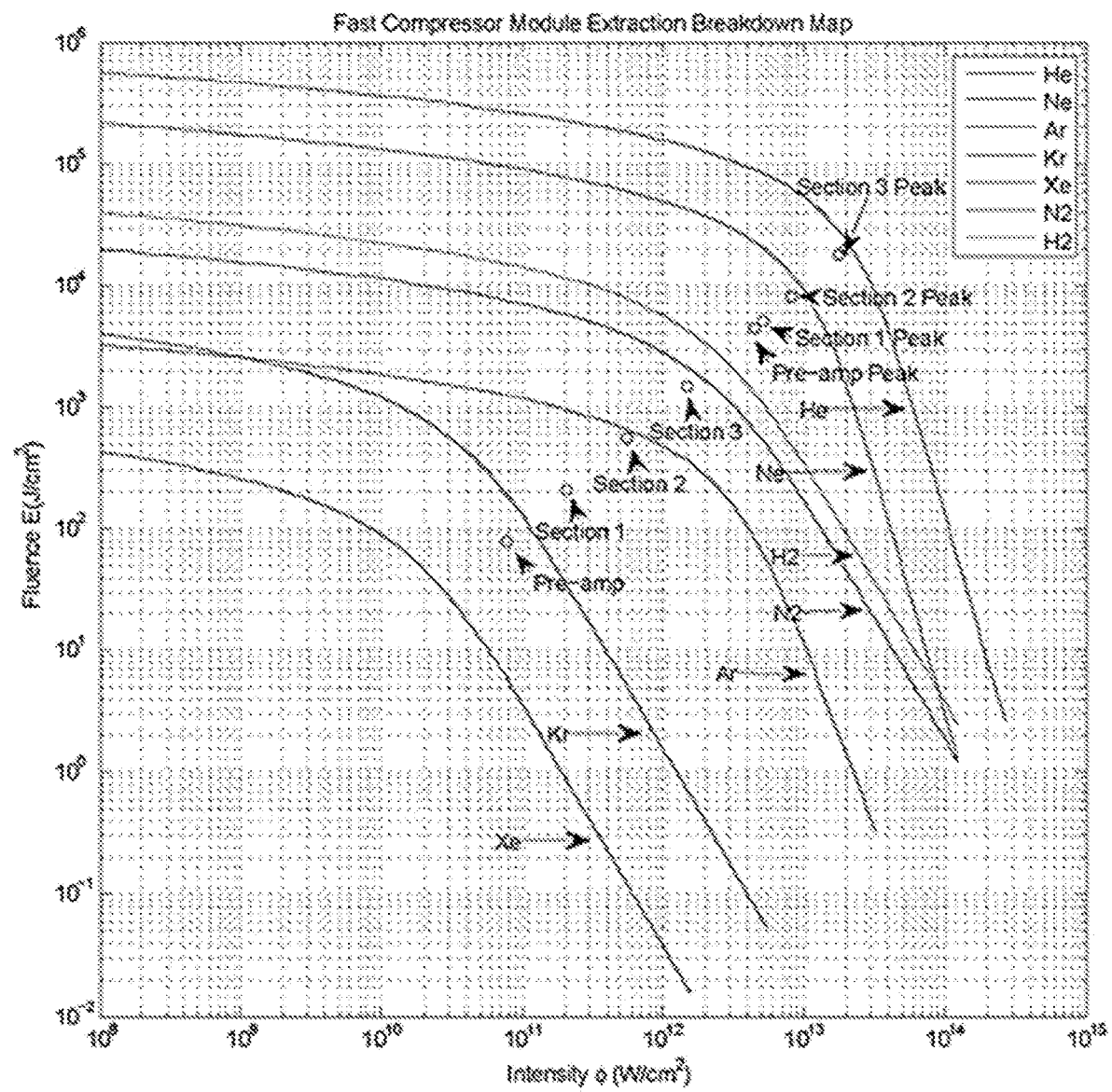
FIG. 14 shows the operating optical fluence at section exit for the FC extraction pulse in a single 25 cm×25 cm FC module (and 3 deep 25 cm×25 cm FC module).
Figure 15:
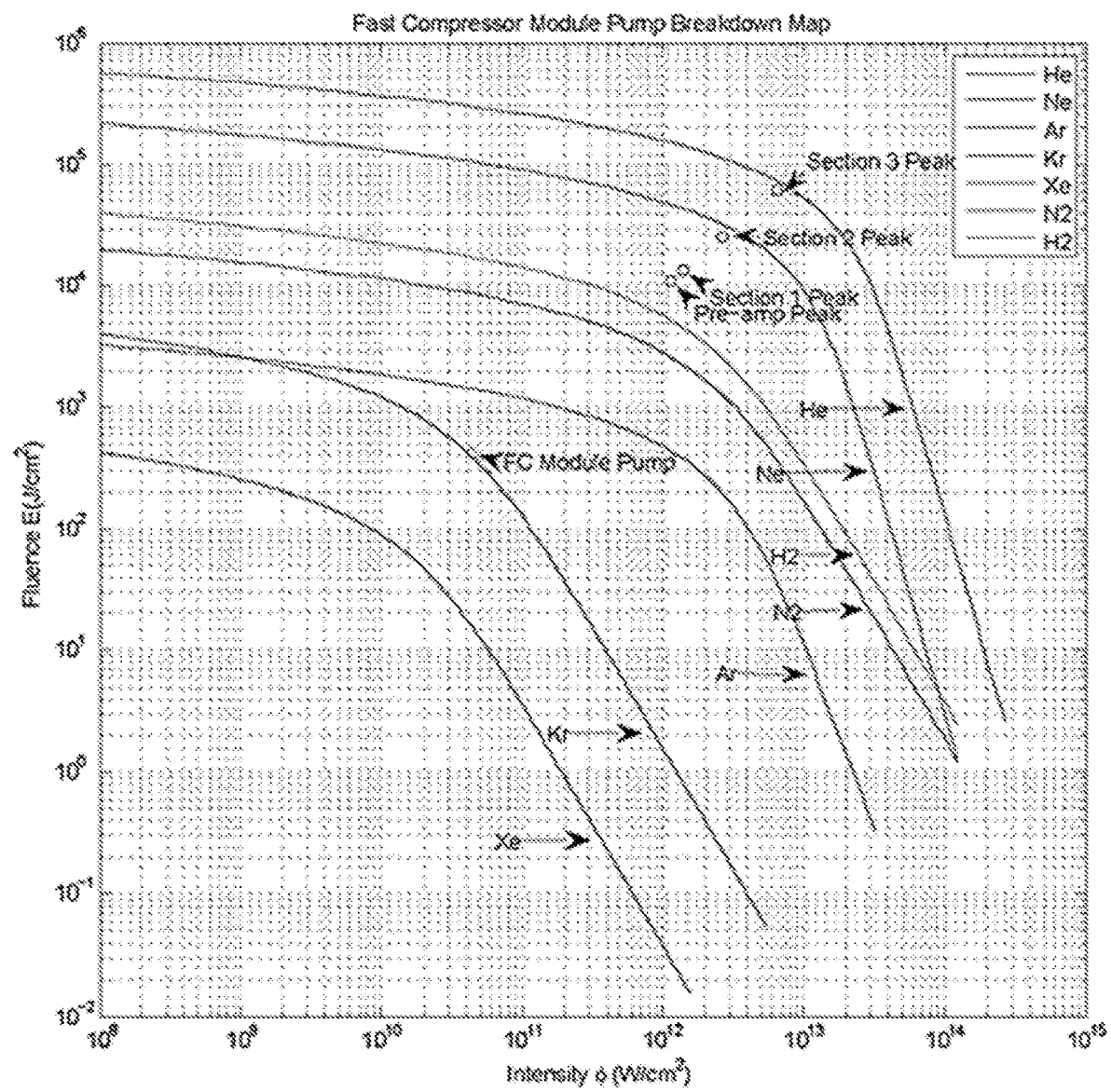
FIG. 15 shows the operating optical fluence at section exit for the FC pump pulse in a single 25 cm×25 cm FC module.
Figure 16:
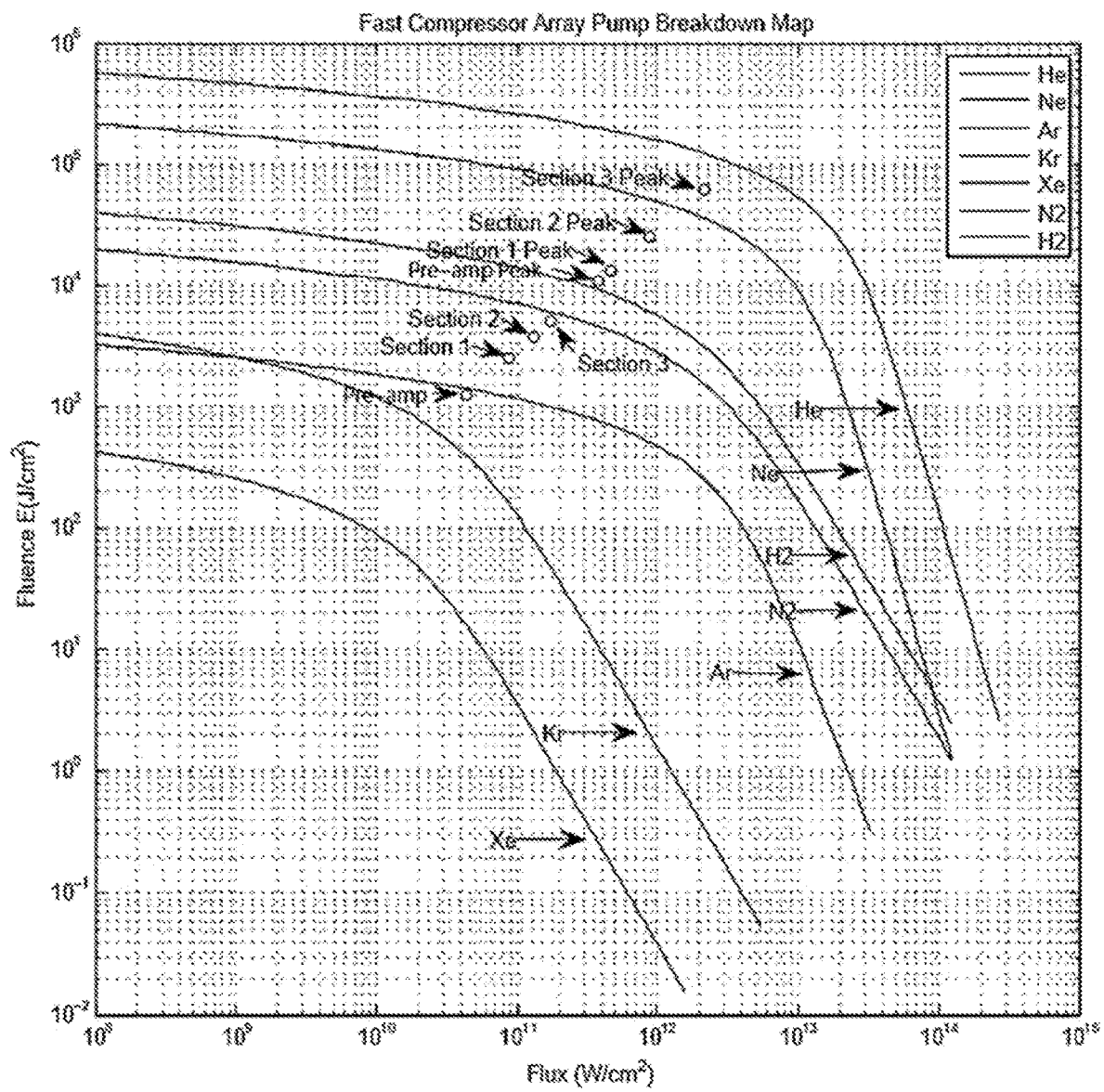
FIG. 16 shows the operating optical fluence at section exit for the FC pump pulse in a 3 deep array of 25 cm×25 cm FC module.

Table 11 gives the array performance. The primary coupling is the increase of pulse length needed for the three deep array. For the single module it is $10^{-8}$ seconds and for the array it is about $3\times10^{-8}$ seconds. Thus, more fluence is needed in the pump beams coming from the DC. FIGS. 14 through 16 show the breakdown maps for the FC module and FC array. The ASE numbers are then somewhat different, due to the increased fluence for the 3 deep array.

TABLE 11

ARRAY PERFORMANCE (25 cm × 25 cm Modules in a 3 × 4 Array)

| Parameter | Pre-amp Section | Section 1 | Section 2 | Section 3 | Transition | Total |
|---|---|---|---|---|---|---|
| Gas | .68 Ne/.32 N2 | .78 Ne/.22 N2 | .97 Ne/.03 N2 | .9 He/.1 Ne | He | |
| $G_c$ (nepers) | 8.00 | 3.5 | 3.5 | 2.5 | | 17.5 |
| $L_p$ (cm) | 72.00 | 46.28 | 124.23 | 333.49 | 147 | 5.76E+002 |
| $G_e$ (saturation fluences) | 1.48 | 3.6844 | 3.6844 | 2.9379 | | |
| $G_{LS0}$ | 5.91E+002 | 2.6844 | 2.6844 | 2.6540 | | 1.13E+004 |
| Exit Output Fluence (saturation fluences) | | 5.3688 | 5.3688 | 3.7952 | 5.3688 | |
| $\gamma_{section}$ (cm/watt) | 2.53E−012 | 1.72E−012 | 6.41E−013 | 1.71E−013 | 1.44E−013 | |
| $\varepsilon_{sat}$ (joules/cm$^2$) | 26.38 | 38.75 | 104.02 | 390.92 | 462.99 | |
| Module Width (cm) | 25 | 25 | 25 | 25 | 25 | 125 |
| Gas Width (cm) | 12.5 | 8.03 | 21.57 | 57.90 | | 100 |
| $\eta_E$ | 0.37 | 0.96 | 0.96 | 0.91 | | |
| $\eta_{OC}$ | | | | | | 0.89 |
| Required Section Drive Energy (J) | 1.58E+006 | 1.02E+006 | 2.73E+006 | 7.33E+006 | | 1.27E+007 |
| $A_{optical}$ | 625 | 625 | 625 | 625 | 625 | |
| Fast Compressor Extraction Pulse | | | | | | |
| $L_{gas}$ (cm) | 432.00 | 277.68 | 745.39 | 2000.92 | 882.35 | |
| $\varepsilon_{input}$ (joules/cm$^2$) | 1.32E−001 | 77 | 208 | 559 | 1484 | |
| $\varepsilon_{input}$ (saturation fluences) | 5.00E−003 | 2.00E+000 | 2.00E+000 | 1.43E+000 | 3.20E+000 | |
| $\varepsilon_{output}$ (joules/cm$^2$) | 78 | 208 | 558 | 1484 | 1484 | |
| $\varepsilon_{output}$ (joules) | 5.85E+005 | 1.56E+006 | 4.19E+006 | 1.11E+007 | 1.11E+007 | |
| $\varepsilon_{input}/\varepsilon_{output}$ | 1.69E−003 | 3.73E−001 | 3.73E−001 | 3.77E−001 | 1.00E+000 | |
| $\tau_{input}$ (seconds) | 1.00E−009 | 1.00E−009 | 1.00E−009 | 1.00E−009 | 1.00E−009 | |
| $A_0$ (cm$^2$) | 7500 | 7500 | 7500 | 7500 | 7500 | 7500 |
| $A_0$ Color Segment Area (cm$^2$) | 625 | 625 | 625 | 625 | 625 | 3125 |
| Number of color segments | 3 | 3 | 3 | 3 | 3 | 15 |
| Fast Compressor Pump Pulse | | | | | | |
| $\tau_{pump}$ (seconds) | 2.88E−008 | 2.88E−008 | 2.88E−008 | 2.88E−008 | | 1.15E−007 |
| # of Channels | 5.00E−001 | 3.21E−001 | 8.63E−001 | 2.32E+000 | | 4.00E+000 |
| $A_p$ (cm$^2$) | 1250 | 803.46 | 2156.8 | 5789.72 | | 1.00E+004 |
| $\varepsilon_{pump}$ (joules/cm$^2$) | 1266.00 | 1266.00 | 1266.00 | 1266.00 | | |
| $\varepsilon_{pump}$ (joules) | 1.58E+006 | 1.02E+006 | 2.73E+006 | 7.33E+006 | | 1.27E+007 |
| Pump Flux (watts/cm$^2$) | 4.40E+010 | 4.40E+010 | 4.40E+010 | 4.40E+010 | | |
| ASE Losses | | | | | | |
| FASE$_{extraction}$ + Spontaneous (%)[5] | 1.98E−002 | 1.45E−002 | 5.53E−002 | 1.02E+000 | 1.92E−001 | |
| BASE$_{extraction}$ + Spontaneous (%)[5] | 5.60E−003 | 3.59E−003 | 3.86E−003 | 2.14E−003 | 8.82E−004 | |
| FASEpump + Spontaneous (%) * | 2.18E+000 | 4.28E−002 | 2.42E−003 | 1.04E−003 | | |
| BASEpump + Spontaneous (%) * | 2.01E−002 | 1.77E−003 | 2.22E−003 | 2.40E−003 | | |
| Extraction Pulse ASE Loss (J/cm$^2$)[5] | 3.30E−003 | 8.61E−003 | 7.56E−002 | 3.91E+000 | 9.54E−001 | |
| Pump Pulse ASE Loss (J/cm$^2$) | 9.27E+000 | 1.88E−001 | 1.96E−002 | 1.45E−002 | | |
| Extraction Pulse ASE Loss (J)[5] | 2.48E+001 | 6.46E+001 | 5.67E+002 | 2.93E+004 | 7.15E+003 | 3.72E+004 |
| Pump Pulse ASE Loss (J) | 6.96E+004 | 1.41E+003 | 1.47E+002 | 1.09E+002 | | 7.12E+004 |
| FASE$_{extraction}$ Peak ASE Angle (deg)[5] | 2.15E+001 | 3.07E+001 | 1.50E+001 | 7.34E+000 | 1.05E+001 | |
| BASE$_{extraction}$ Peak ASE Angle (deg)[5] | 9.01E+001 | 9.01E+001 | 9.01E+001 | 9.01E+001 | 9.01E+001 | |
| FASE$_{pump}$ Peak ASE Angle (deg) * | 6.034 | 4.472 | 4.472 | 3.314 | | |
| BASE$_{pump}$ Peak ASE Angle (deg) * | 1.70E+002 | 1.70E+002 | 1.70E+002 | 1.68E+002 | | |
| $\eta_{ASE}$ | 0.9929 | 0.9999 | 0.9999 | 0.9984 | 0.9994 | |
| Energy Summary | | | | | | |
| Extraction Loss (J/cm$^2$) | 133 | 5 | 14 | 88 | | 239.70 |
| Extraction Loss (J) | 9.98E+005 | 3.81E+004 | 1.02E+005 | 6.60E+005 | | 1.80E+006 |
| Ideal Section Fluence (J/cm$^2$) | 211 | 136 | 364 | 977 | | 1.69E+003 |
| Ideal Section Energy (J) | 1.58E+006 | 1.02E+006 | 2.73E+006 | 7.33E+006 | | 1.27E+007 |
| Ideal Section Energy − Losses (J) | 5.15E+005 | 9.78E+005 | 2.63E+006 | 6.64E+006 | | 1.08E+007 |
| $\eta_{FC}$ | 0.3257 | 0.9611 | 0.9622 | 0.9060 | 0.9994 | 0.8500 |
| Total ASE Loss (J/cm$^2$) | 9.28E+000 | 1.97E−001 | 9.52E−002 | 3.93E+000 | 9.54E−001 | 1.45E+001 |
| Total ASE Loss (J) | 6.96E+004 | 1.47E+003 | 7.14E+002 | 2.95E+004 | 7.15E+003 | 1.08E+005 |
| $G_{LS}$[4] | 521.1190 | 2.6819 | 2.6839 | 2.6470 | | 9.93E+003 |
| Nonlinear Optical Parameters | | | | | | |
| B$_{extraction\ pulse}$ (radians) | 0.1907 | 0.3117 | 0.3755 | 0.4974 | 0.2740 | 1.6495 |
| B$_{pump\ pulse}$ (radians) | 0.2148 | 0.0960 | 0.0431 | 0.0190 | | 0.3729 |
| Pump $\theta_c$ (radians)[1] | 2.18E−004 | 1.82E−004 | 7.43E−005 | 3.02E−005 | | |
| Extraction $\theta_c$ (radians)[1] | 2.90E−004 | 3.95E−004 | 2.61E−004 | 1.75E−004 | 1.72E−004 | |
| Pump $\theta_I$ (radians)[3] | | | | | | [2]3.33E−04 |
| Extraction $\theta_I$ (radians)[3] | | | | | | 4.34E−02 |
| Extraction Peak Breakdown Fluence (J/cm$^2$) | 4.39E+003 | 5.08E+003 | 8.14E+003 | 1.78E+004 | 2.00E+004 | |
| Pump Peak Breakdown Fluence (J/cm$^2$) | 1.11E+004 | 1.34E+004 | 2.56E+004 | 6.18E+004 | | |
| Peak Extraction Fluence (J/cm$^2$) | 7.80E+001 | 2.08E+002 | 5.58E+002 | 1.48E+003 | 1.48E+003 | |

TABLE 11-continued

ARRAY PERFORMANCE (25 cm × 25 cm Modules in a 3 × 4 Array)

| Parameter | Pre-amp Section | Section 1 | Section 2 | Section 3 | Transition | Total |
|---|---|---|---|---|---|---|
| Peak Pump Fluence (J/cm$^2$) | 1.27E+003 | 2.53E+003 | 3.80E+003 | 5.06E+003 | | |
| Total Section Exit Fluence (J/cm$^2$) | 1.34E+003 | 2.74E+003 | 4.36E+003 | 6.55E+003 | 1.48E+003 | |

[1]$\theta_C = 2\sqrt{(\Phi \eta_{l20})}$
[2]1 cm irradiance pattern at 30 m
[3]Linear angle subtended by optical coupling region (radians)
[4]Including losses
[5]Using average section fluence
Note:
These pump ASE losses are for color segmentation at 10 cm.

For forward ASE calculations, extraction pulses were run as 25 cm×25 cm squares. Backward ASE for extracting pulses, as well as pump pulses in both the forward and backward direction, were run as 25 cm diameter circles, except the color segmented pre-amp of the fast compressor array, which was run at a 10 cm diameter. The ASE computations were with a 3-D code and presume segment and section isolation.

FC/DC Integration

Figure 19:
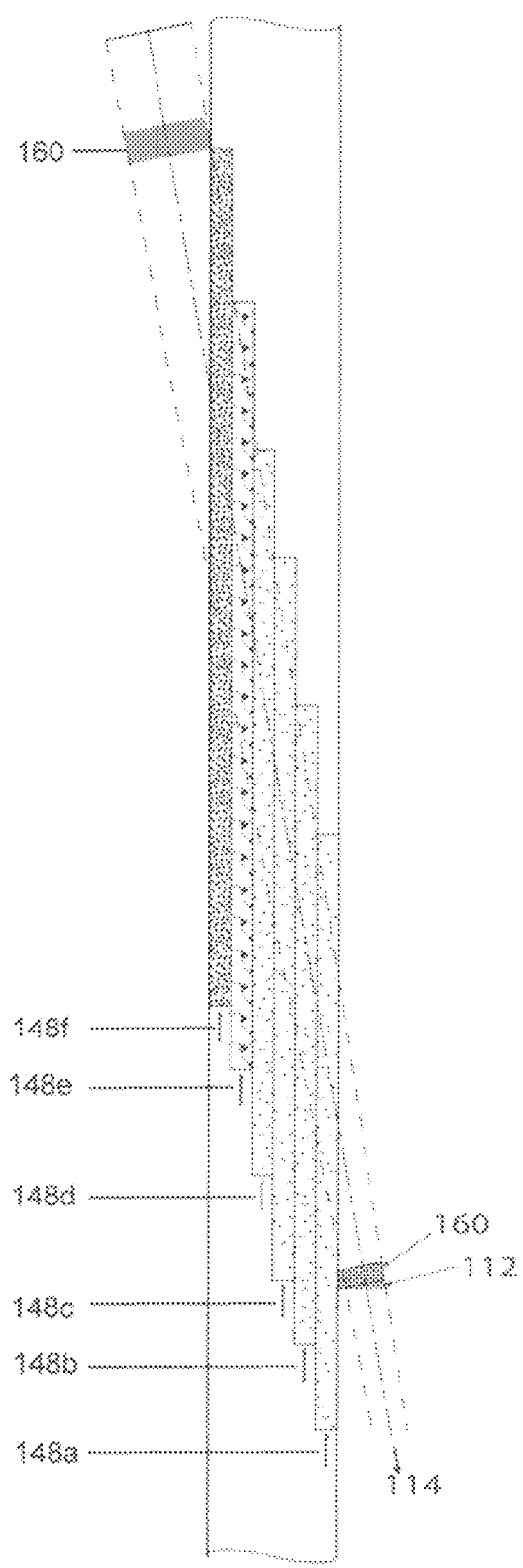
FIG. 19 shows a variation with 6-pump channels with individual channel delays as their pump channel position is matched to FC extraction pulse arrival time.

The integration of the Fast Compressor and the Direct Compressor is outlined in the FIGS. 17 to 20 for various numbers of pump channels and array size. This particular design utilizes a 25 cm square input module for the Fast Compressor. The basic pump channel from the Direct Compressor is 25 cm×1 m. The basic preferred layout shown in FIGS. 9, 10, and 13, are for four 25 cm wide channels staggered in time, each with a 9.6 nanosecond pulse length per module. The modules may be from 1 to 3 deep. FIG. 19 shows a 2 deep array with 6 pump channels and the color segment positions at the time the FC extraction pulse arrives. The crossing angle (from 180° backward scattering) is 10° for the case shown. At this angle, the simple analysis is much like the backward scattering case. The parameters and performance for a single module are shown in Table 4. Overall, the FC large signal gain (G$_{LS}$) is about 10$^4$ and the conversion efficiency is 0.90 relative to the incident light from the Direct Compressor. The output fluence is 1.5×10$^3$ joules/cm$^2$. The analysis shown is for a collinear conversion region and needs to be adjusted for the effect of focusing, as shown in the overall layout. The cell design has been set to keep the FASE (Forward ASE) for the FC extraction pulse at an acceptable level. The output energy/module is then about 1.20×10$^7$ joules/m$^2$. Thus, some eight modules are needed to provide 10$^7$ joules.

A key aspect is that the modules are considered separately. Specifically, they are treated as not affecting one another by ASE, even when placed in proximity to one another. The pump fluence has to increase when the modules are placed together, and so the ASE from the pump increases. Table 11 (FC Array) gives the performance of the 3×4 array. Note the changes in pump properties (fluence, pulse length) as modules are added in the direction of the DC in the plane formed by FC and DC optical axes. As they are added in a direction vertical to that plane, the parameters per area remain the same.

In addition, it may be practicable to color-code the pump pulses from the DC in time sufficient to decouple them in terms of FASE for the pump beams. This also serves to identify a particular pump color with a particular extraction module, so if there is utility to separating the pumps of the modules, by color or other characteristic, this may be the means employed. For the particular baseline design described herein, it does not appear necessary.

Figure 22:
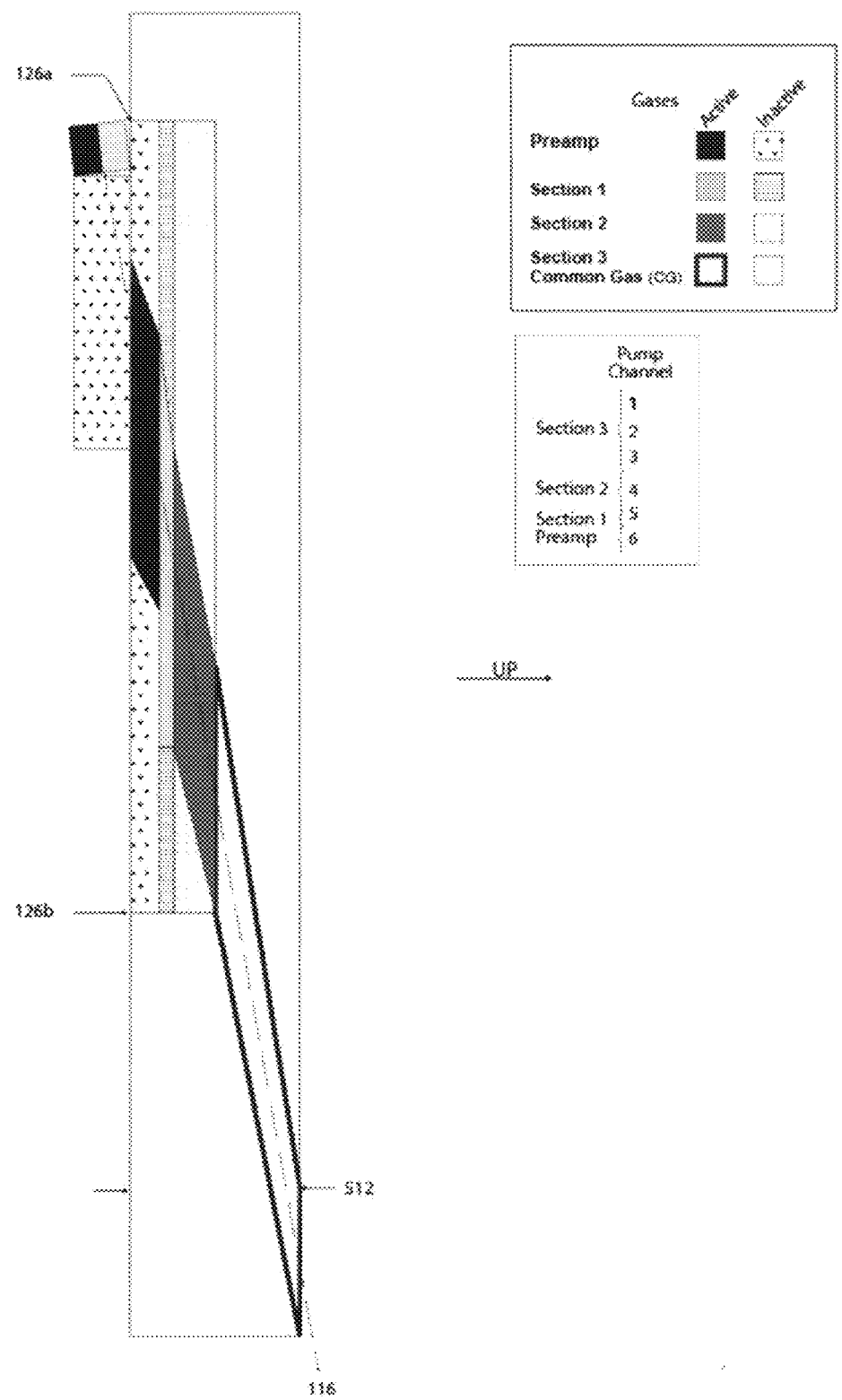
FIG. 22 shows a side view of shutter arrangement for pooled gases of FIG. 21.

One interesting aspect of the layout shown in FIGS. 21 and 22 is simplification due to using a common FC and DC gas. Here, the blocks of pump light and the interaction region are shown. For the gas regions, some mechanical simplification may be obtained by utilizing the same gas in the FC as is in the output of the DC. There is a matching condition for the performance of the FC to the DC that needs to be met; however, such an arrangement reduces the gas separation requirements.

The basic section and channel allocation in these designs are set primarily by the FASE for the extraction pulse and the desire to pump with uniform fluence from the DC over the FC interaction region. However, the DC output beam fluence may be varied as well.

By employing the gases shown, the effective gain media in the FC (110) are N2 and Ne, and they have an overlapping spectral response for STMS. The above analysis does not include the slight gain peak differences, and the baseline design is for a single FC pump color set at the midpoint of their spectral peaks, i.e., $$v_{FC} = v_{DC} - \frac{(v_{PSTMSN_2} + v_{PSTMSNe})}{2}.$$

The baseline design has the FC gases arranged in layers with the target horizontally removed from the interaction zone. One advantage to the variant shown in FIG. 21 is that, since the high FC gases are denser and are placed in the earlier sections, the interfaces between sections are gravitationally stable in this arrangement and index fluctuations are set by local thermal fluctuations and low velocity local eddies giving mix. The shutters in the baseline design in the FC optical path, if any, may be slowly actuated as the gravitational field will not drive motion. The shutters to isolate the FC, P, and DC gases in the direction of the DC beams are not in the FC optical path. They may be actuated more rapidly and act over a smaller distance. FIG. 22 shows the basic arrangement for the gases and the regions they occupy for the 3×4 optical array at the 25 cm segmentation size. This design has two shutters (126a and 126b) within the Pump Channel Envelope (512). The RAC to DC light pass through the interface and toward Target (116). The layered gas is provided by controlled, slow vertical injection that displaces the light and gas upwards. This shows the collimated FC extraction beam used in computations for ASE in the tables. Thus, the beam envelopes are slightly different.

For the DC (142) and the VT (112), physical segmentation between modules may be utilized in a straight forward fashion in place of color segmentation. However, in the FC interaction region, introduction of physical baffles become more difficult, and if the segmentation (module beam path) size is reduced to suppress ASE, at some point the separation apertures optically become too small to provide the desired target patterns. The array apertures may need to be optically phased across the segment size. Of course, optically having the FC segments is a straight forward use of the AO units.

Figure 23:
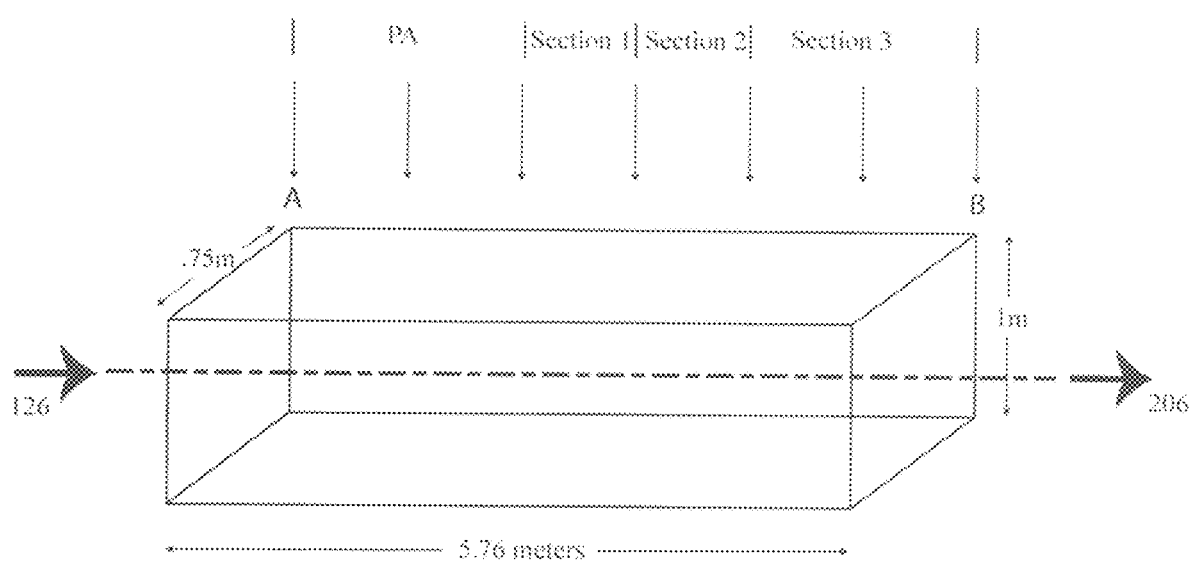
FIG. 23 shows a vertical flow to form FC section gases; Preferred Embodiment FC sections.

In addition to the discrete section embodiments for compression stages, there are also continuous section embodiments. These allow the compression medium to be operated at a given value of the ratio of extraction fluence to saturation fluence, $\varepsilon_{S_\varphi}$), where $\varphi$ is the crossing angle. The advantage of this arrangement is that a high extraction efficiency may be obtained without ASE that is sensitive to the exact value of the saturation fluence. In addition, the continuous variation of the coupling constant may entail and continuous variation in gas density, resulting in a shift of the Brillouin peak, thereby suppressing the ASE. A continuous variation in the coupling constant of the desired nature may be obtained, as shown in FIG. 23. Though drawn for discrete direct compressor section gas, a flowing gas may have its coupling constant varied by controlling the laminar flow mixture along the dimension parallel to the direction of the extraction pulse. Here, the gas properties are varied by injecting different concentrations of gas going from A to B. For example, at A, pure N2 may be injected, and at B, pure Ne. In between upstream mixing nozzles, inject a mixture of N2 and Ne tailored to maintaining the desired $\gamma_C$ profile going from A to B. A simple way to do this is to have the flow velocity constant between A and B, but have the gas mixture continuously variable by adjusting the mixing nozzle pressures (for example, in a manifold where before injection into the Fast Compressor region). Again, another advantage of such an arrangement may be its ability to suppress ASE, as compared to the discrete section design.

One note is that if the FC is injected with two linear polarizations aligned ±45° to the direction of linear polarization for the pump beams, the coupling constants will decrease as ~cos(45°), or, go to one-half the value compared to 0° rotation from the plane of the linear pump beam polarization. Given that the ASE for the extraction pulse is driven by the extraction pulse itself, at ±45° the two polarizations will act independently. Thus, for this particular case, the overall extraction coupling constant will be the same:

$$\gamma+45°=\frac{1}{2}\gamma 0°=\gamma-45°, \gamma TOT=\gamma+45°+\gamma-45°=\gamma 0°.$$

The $\varepsilon_{SAT}$ will be 2 $\varepsilon_{SAT0}$, and the ASE will scale as though one-half the fluence is driving each polarization. The results from the first case with one pump and one extraction polarization then go directly to this case except twice the output fluence will be obtained. Of course, the pump fluence will need to be doubled. The effect of convergence due to focusing at a 2:1 area ratio may be estimated to give the same results as the unfocused case for ASE and extraction efficiency yet twice the fluence. Thus, the Preferred Embodiment design may be directly extrapolated to twice the output fluence, assuming the ±45° FC input polarizations and twice the single linear polarization pump pulse fluence. A self-consistent, focused extraction and ASE code with the polarization dependence, including effect of pump area variation to give high coupling efficiency, should be utilized for a detailed design.

There are four main variants in terms of stage optical axis alignment: the first is the alignment of the NSAC with the DC as in FIG. 1; the second is the positioning of the FC with respect to the NSAC input pump beam i.e., the NSAC input doesn't have to pass through the FC; and the third is the crossing angle of the FC with respect to the DC. The fourth (FIG. 26) shows the case where the NSAC is divided in two and injects the NSAC pump beam into the DC off axis. Note the reflective surfaces introduced into the DC. However, the DC output does not impinge on the NSAC optics. The NSAC beam does not pass through the FC in the particular case shown. However, provision must be made to make the interior surface of the DC reflective. Beam dumps may be arranged to accept the NSAC light without having it impinge on the DC input optics. The simplifications introduced by the geometry with respect to the NSAC and DC input optics are to be balanced against the cost of the reflective surface in the DC. An added advantage is the possibility of high optical coupling efficiency in the FC region by imaging the DC onto the FC zones. The Primary Laser Source (PLS) may also be utilized to directly pump the DC, either on or off axis.

The FC crossing angle to the DC beams may be varied. The various parameters relating to the geometry and ASE vary considerably. The case shown for immediate application has a 10° crossing angle. For this condition, nominal 25 cm×25 cm optical extraction area module for both the DC and FC have been shown. Such a module is a building block in an array of modules. Tables 10 and 4 show such modules and combine them for a 10° crossing angle. For these designs, a 25 cm extraction module size has been chosen to provide acceptable imaging and to represent an ASE isolation size achievable with the techniques outlined herein. However, other sizes may be optimum as a function of crossing angle.

There are three primary considerations in the integration. First is optical performance in terms of delivering a large amount of energy into a relatively small target at high overall efficiency. Second, in order to minimize cost, is keeping the overall high optical quality area to a minimum. Third, since the Preferred Embodiment works at very high optical fluence, is to avoid damage to permanent optical elements.

The inline configuration shown appears to be the most straightforward; however, with this geometry the line of sight from the NSAC to the Direct Compressor may need to be changed to avoid the FC active sections. The coupling efficiency and reduced need to shape the beams of light have resulted in the inline configuration for NSAC to DC that is in the Preferred Embodiment. Both the LPM to NSAC and DC to FC coupling are at substantial offset angles, meaning that unconverted light from the pumping stage won't be directed back at the seed laser beam optics (see FIG. 5). The need to minimize high quality optical area and mechanical complexity leads to the compact 3×4 array type of design for the FC optics shown in FIGS. 12a-c. The inline NSAC to DC arrangement shown in FIG. 1 has the NSAC output passing through the FC region. Since the fluxes in the FC media from the NSAC output are almost the compression ratio (1-2×10³) lower, the FC sections will not become active with respect to nonlinear scattering properties driving the passage of the NSAC beam. However, the NSAC output may influence the FC media; for example, particles in the FC media could be vaporized, expand and then serve as scattering regions when the FC extraction pulse arrives. The optical quality of the FC path to the target is a major consideration. With standard practice for particulate control, the distortion produced should be controllable.

Figure 20:
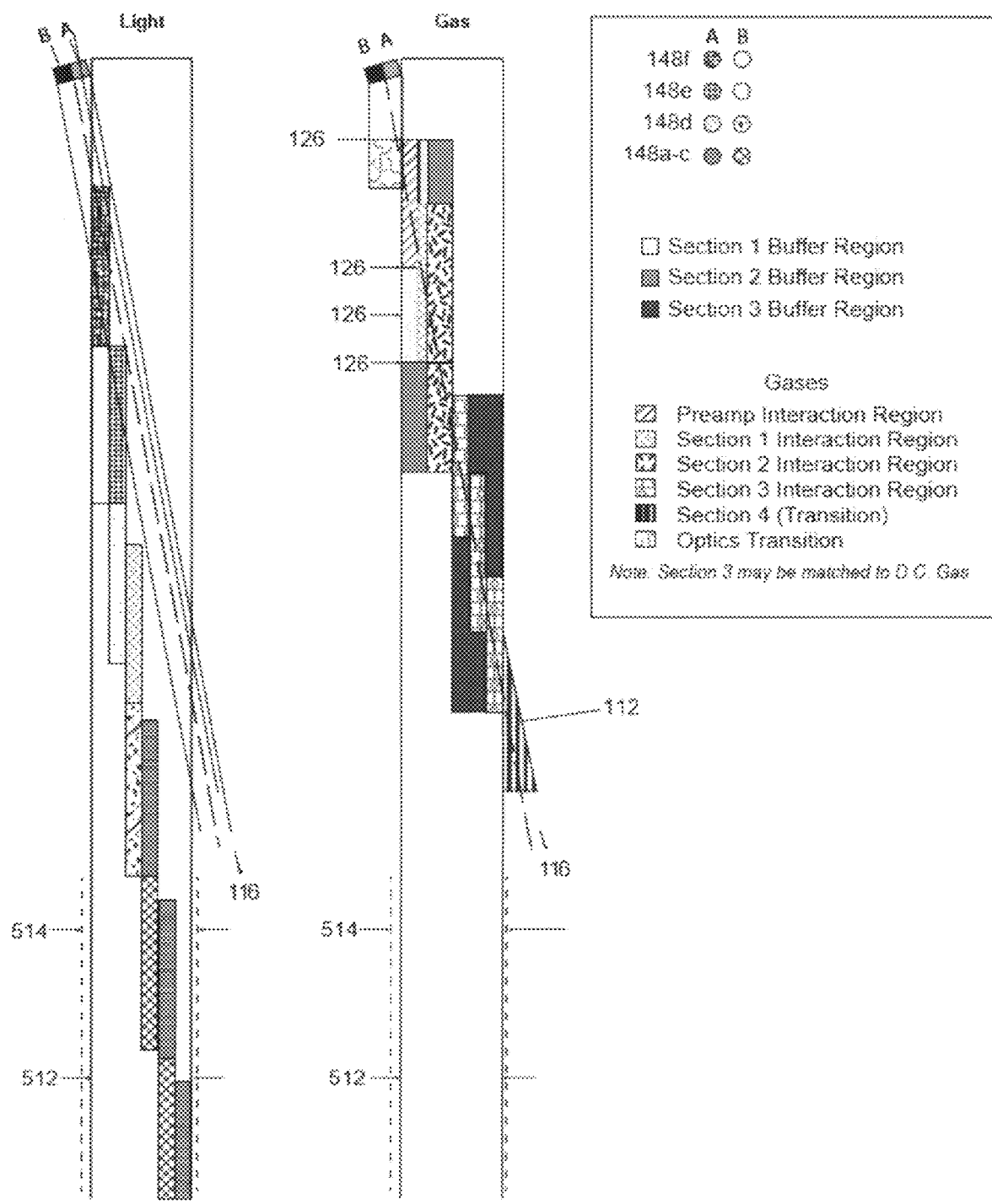
FIG. 20 shows mechanical shutters to isolate FC section gases for 2 wide FC array with 6 pump channels.

In addition, any mechanical element the NSAC impinges on may vaporize and reduce the gas purity for subsequent shots. Thus, the means of controlling the gas interfaces may be constrained by having the NSAC-DC optical axis pass through the FC active region. Good optical interfaces between section gases is essential to a near diffraction limited FC output. Various configurations are shown in FIGS. 20 through 22 for providing the section gas region with shutters. FIG. 20 shows the top view of a 2×4 array for the FC section with DC pump pulses. Also, FIG. 21 and FIG. 22 show an approach where the FC section interfaces may be stably stratified due to the fact that the early sections have higher density that later sections and are located below them with respect to gravity. Note that the FC-DC plane is rotated from the horizontal so that the target would be above the DC. In this geometry, no fast shutter, index, and/or density matching may be required. The only fast shutters are removed from the FC optical axis and are used only to separate the DC section(s) and P section(s). An adaptive optics (A/O) system may be utilized on the input optical beam for the FC. To be within the isoplanatic angle limit set by the target irradiance pattern, the A/O system may compensate for linear media fluctuations and may be used to compensate repeatable nonlinear and VT induced optical fluctuations.

The length of the medium between the output of the FC and the VT may be set by both FASE and B integral buildups; a gas such as neon or helium is preferred for this section. The matching of the output of the DC to the FC efficiently was discussed in the DC section. Another variant shown is the FC gas section being formed by a flowing gas stream. FIG. 23 illustrates a means of producing the section gas mixtures in the FC section and separation region while controlling the section interfaces in the FC optical extraction path by injecting various gas streams with a wind tunnel type configuration. With an A/O system and low flow velocity, this may produce good (low optical path distortion) section interfaces. The DC-FC and P-FC interfaces may have shutters, but the permissible optical quality is much worse. Variants with a fewer number of FC sections, while not having as good an idealized stage gain performance, may be superior in terms of overall simplicity at the expense of some efficiency.

FIG. 26 shows an arrangement where the NSAC or PLS optical axis is offset from the DC optical axis. At the price of grazing angle reflectors placed in the DC, the issues associated with avoiding NSAC/DC optical damage due to the on axis geometry are largely removed. Now each stage of the compression stages has an optical axis not aligned with the other stages. Unconverted light from the upstream stage may then be directed away from the seed beam injection optics for a given stage. FIG. 26 is end pumped, that is the pump beams are injected through the DC output aperture. In addition, it may be extended to the geometry of FIG. 27, where the DC is side pumped. This arrangement also lends itself to the NSAC or PLS optical output not having to have a 1:1 optical area match to the DC optical output. Thus, a lower fluence pump for the DC may be utilized, leading to matching to a wide variety of conventional laser sources.

Figure 27:
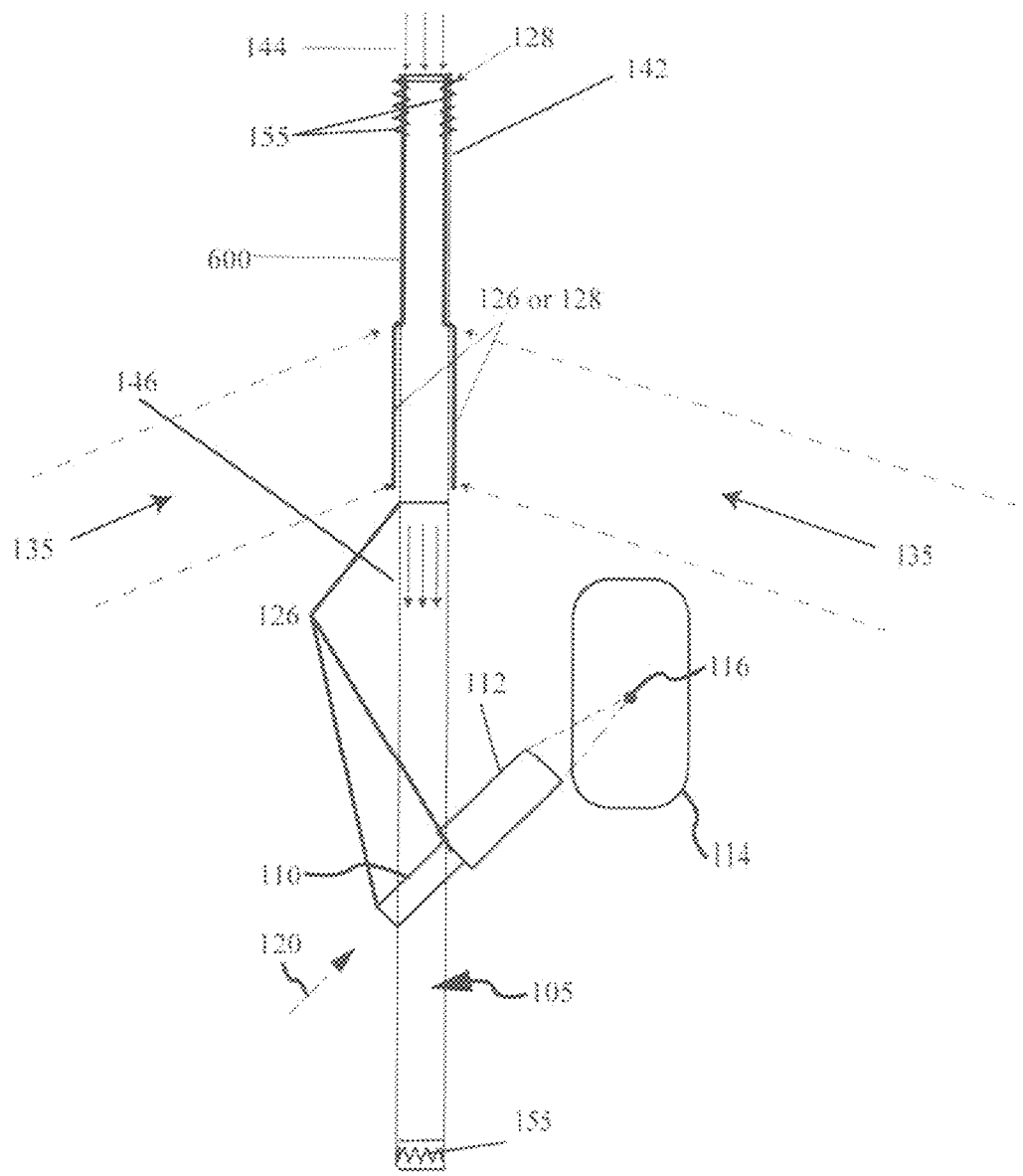
FIG. 27 shows an Integrated Direct Compressor and Aperture Combiner.

In FIG. 27, NSAC (104) or PLS (134) may be utilized to side pump the DC. Since the crossing angle may be small, the DC pump light may be transmitted through the sides of the DC and, hence, have a large optical area and therefore be injected at low fluence. At the larger pump area and lower optical surface fluence for side pumping, the use of material DC windows may become practicable. For both end and side pumping of the DC as shown, the turning arrays for the LPMS and the NSAC may then be traded off for the side reflectors in the DC. Flat, low quality reflectors are relatively inexpensive per unit area. This may avoid the need for the NSAC and effectively turns the DC into both a compressor and beam combiner.

FIG. 27 shows elements arranged to provide both aperture combination and compression in the same Direct Compressor (142). Here, the Primary Laser Source Beams (135) enter the sides of Direct Compressor (142) through either Shutters (126), Transient Apertures (126) or Windows (128) at a counter-propagating angle to the Direct Compressor Output Beams (146). As the Primary Laser Source Beams (135) propagate through the Direct Compressor (142), they impinge on High Fluence Material Mirrors (600) that then reflect the Primary Laser Source Beams (135) back into the Direct Compressor (142) and keep them in the region to actively convert their energy into the energy of the Direct Compressor Output Beams (146). The Beam Dumps (155) are there to intercept unconverted Primary Laser Source Beams (135) energy. They are designed in conjunction with the Window (128) to avoid permanent damage to the Window (128). The Direct Compressor Output Beams (146) exit the Direct Compressor (142) propagate through the Propagation Gas (105) and pump the Fast Compressor (110). The properties of the Direct Compressor Output Beams (146) are in accord with the preceding discussion on integration with the Fast Compressor (110). The use of the High Fluence Material Mirrors (600) imposes restrictions on mirror positioning and reflectivity properties. Specifically, they may be designed and positioned so as to not substantially enhance the DC extraction pulse ASE by returning it at an angle matched condition to the DC active region. This places constraints on coating properties and surface angle. The use of color segmentation for the DC extraction pulse as outlined above relaxes the FASE reflectivity condition relative to an unsegmented extraction pulse.

This arrangement eliminates the need for an NSAC unless it finds use in generating the Primary Laser Source Beams (135); i.e. it is not needed to match the PLS to the DC. For the Direct Compressor (142), the analysis above for the Preferred Embodiment does not indicate the need for color and/or polarization segmentation in the Primary Laser Source Beam (135) as a means of suppressing the ASE for such beams, and the coupling constant for the Direct Compressor (142) extraction beams does not change substantially for typical offset angles from the direction of the Primary Laser Source Beams (135). Thus, the ability to operate at high fluence and high efficiency for such a Direct Compressor pumped directly by the Primary Laser Source may be realized.

The invention claimed is:
1. An integrated arrangement comprising:
   a primary laser source to emit a primary laser source beam;
   a direct compressor to receive the primary laser source beam and output a direct compressor extraction beam;
   a plurality of high fluence material mirrors to receive and reflect back the primary laser source beam from the direct compressor to convert into energy output from the direct compressor extraction beam;
   a propagation gas to receive the output of the direct compressor extraction beam;
   a fast compressor to receive the output of the direct compressor extraction beam through the propagation gas; and
   a beam dump to intercept any unconverted energy from the primary laser source; and wherein said director compressor produces a large temporal compression ratio of about 300:1 to pump the fast compressor.

2. The system of claim 1, further comprising a means for receiving the primary laser source beam through sides of the direct compressor at a counter-propagating angle to the output of the direct compressor extraction beam.

3. The system of claim 1, further comprising a means for receiving the primary laser source beam through ends of the direct compressor.

4. The system of claim 1, wherein the fast compressor and direct compressor stages operate at the same pressure simultaneously.

5. The system of claim 1, further comprising a means for temporally and spatially compressing a plurality of primary laser source beams.

6. The system of claim 1, further comprising a means to modulate a polarization of the primary laser source beam across to the direct compressor.

7. The system of claim 6, wherein adjacent segments of the direct compressor extraction beam have different segment polarizations.

8. The system of claim 1, further comprising a means to modulate the color of the primary laser source beam across to the direct compressor.

9. The system of claim 8, wherein adjacent segments of the direct compressor extraction beam have different colors.

10. The system of claim 1, further comprising a means to modulate the material partitions of the primary laser source beam across to the direct compressor.

11. The system of claim 10, wherein adjacent segments of the direct compressor extraction beam have different material partitions.

12. A method of integrating an arrangement comprising:
generating a primary laser source beam;
receiving the primary laser source beam in a direct compressor;
receiving and reflecting back the primary laser source beam from the direct compressor to convert into energy output from the direct compressor with a plurality of high fluence material mirrors;
receiving an output extraction beam from the direct compressor through a propagation gas;
receiving the output extraction beam of the direct compressor through the propagation gas in a fast compressor;
intercepting any unconverted energy from the primary laser source in a beam dump; and
producing a large temporal compression ratio of about 300:1 to pump the fast compressor.

13. The method of claim 12, further comprising receiving the primary laser source beam through sides of the direct compressor at a counter-propagating angle to the output extraction beam of the direct compressor.

14. The method of claim 12, further comprising receiving the primary laser source beam through ends of the direct compressor.

15. The method of claim 12, further comprising operating the fast compressor and direct compressor stages at the same pressure simultaneously.

16. The method of claim 12, further comprising temporally and spatially compressing a plurality of primary laser source beams.

17. The method of claim 12, further comprising modulating polarization of the primary laser source beam across to the direct compressor, wherein adjacent segments of the extraction beam of the direct compressor have different segment polarizations.

18. The method of claim 12, further comprising modulating color of the primary laser source beam across to the direct compressor, wherein adjacent segments of the extraction beam of the direct compressor have different colors.

19. The method of claim 12, further comprising modulating material partitions of the primary laser source beam across to the direct compressor wherein adjacent segments of the extraction beam of the direct compressor have different material partitions.

20. The method of claim 12, further comprising operating at a high optical fluence output in excess of about 500 joules/cm$^2$.

* * * * *